(12) United States Patent
Graham

(10) Patent No.: US 9,151,689 B2
(45) Date of Patent: Oct. 6, 2015

(54) FLEXIBLE LEAK TEST APPARATUS AND METHOD

(75) Inventor: John Graham, Clinton Township, MI (US)

(73) Assignee: Comau Inc., Southfield, MI (US)

( * ) Notice: Subject to any disclaimer, the term of this patent is extended or adjusted under 35 U.S.C. 154(b) by 306 days.

(21) Appl. No.: 13/428,451

(22) Filed: Mar. 23, 2012

(65) Prior Publication Data

US 2013/0074584 A1    Mar. 28, 2013

Related U.S. Application Data

(60) Provisional application No. 61/466,848, filed on Mar. 23, 2011.

(51) Int. Cl.
*G01M 3/02* (2006.01)
*G01M 3/32* (2006.01)

(52) U.S. Cl.
CPC ................ *G01M 3/02* (2013.01); *G01M 3/025* (2013.01); *G01M 3/3236* (2013.01); *G01M 3/3281* (2013.01)

(58) Field of Classification Search
CPC . G01M 3/025; G01M 3/3236; G01M 3/3263; G01M 3/229; G01M 3/3209; G01M 3/3227; G01M 3/3281; G01M 13/005; G01M 15/02; G01M 3/02; G01M 3/3218; G01M 3/32; G01M 3/363
USPC ........ 73/41, 40, 37, 114.77, 116.01, 49.7, 45, 73/45.1, 45.2
See application file for complete search history.

(56) References Cited

U.S. PATENT DOCUMENTS

| | | | |
|---|---|---|---|
| 3,313,143 A | 4/1967 | Evans et al. | |
| 3,648,819 A | 3/1972 | Converse, III et al. | |
| 3,695,099 A * | 10/1972 | Viano | 73/116.05 |
| 3,785,195 A | 1/1974 | Yasuhiro et al. | |
| 4,010,840 A * | 3/1977 | Eberle | 198/345.1 |
| 4,602,499 A * | 7/1986 | Norton et al. | 73/41 |
| 5,010,761 A | 4/1991 | Cohen et al. | |
| 5,160,011 A | 11/1992 | Yoshiji et al. | |
| 5,265,464 A | 11/1993 | Caron et al. | |
| 5,618,990 A * | 4/1997 | Iwao et al. | 73/40 |
| 6,112,578 A | 9/2000 | Black et al. | |
| 6,330,822 B1 | 12/2001 | Hawk et al. | |
| 6,578,407 B1 * | 6/2003 | McTaggart | 73/40 |

(Continued)

FOREIGN PATENT DOCUMENTS

EP    1 014 068    6/2000

*Primary Examiner* — Hezron E Williams
*Assistant Examiner* — Marrit Eyassu
(74) *Attorney, Agent, or Firm* — Young Basile Hanlon & MacFarlane P.C.

(57) ABSTRACT

A flexible leak test apparatus and method for leak testing a variety of workpieces having various multiple configurations with at least one internal cavity and at least one aperture leading therefrom. The flexible leak test apparatus and method provide a plurality of leak test fixtures adaptable to receive the workpieces. Each leak test fixture has a bottom portion and a top portion that engage one another when the workpieces are loaded in the bottom portion of the leak test fixture. The leak test fixtures are shuttled in and out of the workstation, and a manipulator loads and unloads the workpieces into and out of the bottom portion of the leak test fixtures. The leak test fixtures seal the apertures in the workpieces so that the workpieces can be leak tested by pressurizing the internal cavity of the workpiece.

20 Claims, 21 Drawing Sheets

(56) References Cited

U.S. PATENT DOCUMENTS

| | | |
|---|---|---|
| 2007/0094858 A1 | 5/2007 | Park |
| 2007/0157714 A1 | 7/2007 | Rankin et al. |
| 2008/0216560 A1 * | 9/2008 | Ridgway et al. ............ 73/40.5 R |
| 2008/0295572 A1 | 12/2008 | Hansford et al. |
| 2012/0073359 A1 * | 3/2012 | Hanson et al. .................... 73/40 |

* cited by examiner

FLEXIBLE LEAK TEST APPARATUS AND METHOD

CROSS-REFERENCE TO RELATED APPLICATION

This application claims priority to U.S. Provisional Patent Application Ser. No. 61/466,848, which was filed on Mar. 23, 2011.

FIELD OF THE INVENTION

The present invention relates to a flexible leak test apparatus and method, and in particular, a flexible leak test apparatus and method that provides for the leak testing of various workpieces having multiple geometric configurations through the use of a single manufacturing cell.

BACKGROUND OF THE INVENTION

Today's manufacturing industry has become increasingly competitive, especially the automotive industry. In the past, most automotive manufacturing machinery and assembly lines were dedicated to one specific model of automobile so that hundreds of thousands of automobiles could be produced on the same dedicated lines at a relatively inexpensive cost. However, with the advent of numerous automobile manufacturers, the automobile market has forced automobile manufacturers to develop many new and different options of automobiles so as to satisfy all of its customers' demands. The manufacturing and assembly lines that are dedicated to single models of automobiles are inefficient in that they must be retooled and/or replaced upon manufacturing new models of automobiles. In addition, such dedicated manufacturing and assembly lines can lead to excessive downtime, since the entire line must be stopped in order to perform necessary maintenance or repairs. This creates inefficiencies that are undesirable in any industrial environment, not just the automotive industry.

In order to reduce such inefficiencies, it has been necessary to reduce the cost of manufacturing and assembling automobile components by designing flexibility into the machinery such that various components and models can be manufactured from the same machinery. In addition, the machinery must be automated so as to reduce the amount of manual labor that is required to manufacture the automobile components, since labor is a large cost component associated with manufacturing automobiles. By providing flexible and automated machinery to produce various automobile components, the cost of machinery and labor is reduced, thereby reducing the cost associated with manufacturing automobiles.

These same principals apply to the equipment and methods utilized to leak test various components of an automobile, such as cylinder heads, clutches, transmission parts, water and vacuum pumps, and cylinder blocks. Specifically, engine blocks and cylinder heads must be leak tested to ensure that the engine will perform properly when assembled into its final configuration. Leak testing components prior to their assembly into the final product avoids incorporating defective components into the final product and the costs associated with such defective products. By incorporating flexibility into the machinery that performs the leak testing for such components, such as engine blocks and cylinder heads, the cost of manufacturing such components is reduced. Thus, there is a savings in creating less defective components at a lower manufacturing cost by using flexible machinery. Therefore, it would be desirable to provide flexible and automated leak test equipment that could automatically leak test a variety of different automobile components for different engine sizes and different types of automobiles in order to reduce the cost associated with manufacturing such automobiles.

SUMMARY OF THE INVENTION

The present invention provides a flexible leak test apparatus and method for leak testing workpieces in a workstation wherein the workpieces have multiple geometric configurations with at least one internal cavity and at least one aperture leading therefrom. The flexible leak test apparatus and method includes a plurality of leak test fixtures adaptable to receive the workpieces having multiple geometric configurations, wherein the leak test fixtures have a bottom portion and a top portion. A shuttling means moves the leak test fixtures in and out of the workstation. A manipulator loads and unloads the workpieces into the bottom portion of the leak test fixtures. The top portion of the leak test fixtures removably engages the bottom portion of the leak test fixtures when the workpieces are loaded into the bottom portion of the leak test fixtures. The leak test fixtures seal the at least one aperture in the workpieces so that the workpieces can be leak tested by pressurizing the at least one internal cavity of the workpieces.

The shuttling means may provide a pair of substantially parallel rails leading to and from the workstation for slidably moving and supporting the bottom portion of the leak test fixtures. A shuttle drive provided between the rails moves the leak test fixtures in and out of the workstation. In an alternative embodiment, the shuttle means may provide a plurality of wheeled carts having the leak test fixtures mounted thereon, wherein the wheeled carts are manually directed to and from the workstation. A pair of guide rails in the workstation guide and stabilize the wheeled carts in the workstation.

The manipulator of the present invention may provide at least one robotic arm mounted to an overhead gantry. In an alternative embodiment, the manipulator may provide a self-standing robotic arm.

The manipulator may engage the top portion of the leak test fixtures and place the top portion on the bottom portion of the leak test fixtures in an engaged position, wherein the leak test fixtures are in a position to leak test the workpieces, and a disengaged position, wherein the top portion is disengaged from the bottom portion of the leak test fixtures for loading and unloading the workpieces into the bottom portion of the leak test fixtures. In an alternative embodiment, the top portion of the leak test fixtures may be hingedly connected to the bottom portion of the leak test fixtures for movement between an engaged position, wherein the top portion engages the bottom portion of the leak test fixtures for leak testing the workpieces, and a disengaged position, wherein the top portion is disengaged from the bottom portion of the leak test fixtures for loading and unloading the workpieces into the bottom of the leak test fixtures. A motor may be connected to the leak test fixtures for hingedly moving the top portion of the leak test fixture between the engaged position and the disengaged position.

The leak test fixtures may have at least one linear actuator connected thereto, and the linear actuators may have a sealing device connected thereto for automatically sealing the at least one aperture in the workpieces for leak testing the workpieces. The leak test fixtures are in communication with a pressurized fluid source, wherein the pressurized fluid source sealedly connects to the internal cavity of the workpieces for leak testing the workpieces. The leak test fixtures have at least one sensor for sensing pressure in the internal cavity of the workpieces, and the at least one sensor is in electronic communication with a computer, wherein the computer interprets signals from the at least one sensor to determine if the workpieces are leaking. A controller interface has a first portion connected to the leak test fixture and in electronic communication with the at least one sensor, and a second portion is located in the workstation and in electronic communication with the computer. The first portion and the second portion of the controller interface are releasably engageable with one another such that the first portion and the second portion of the controller interface engage one another in the workstation prior to testing the workpieces such that the at least one sensor is in communication with the computer when leak testing the workpieces.

At least one press fixture is adaptable to receive the workpieces having multiple geometric configurations. A moving means moves the at least one press fixture in and out of the workstation. The manipulator loads and unloads the workpieces into the at least one press fixture and loads a component to be press fit into the workpieces. A press tool press fits the component into the workpieces. The manipulator may releasably engage the press tool for press fitting the component into the workpieces with the press tool. In an alternative embodiment, the press tool may be a self-standing press located in the workstation. The at least one press fixture may be rotatable to allow the press fitting of the components into various sides and angles of the workpieces.

At least one conveyor may be provided for moving the workpieces to and from the workstation.

BRIEF DESCRIPTION OF THE DRAWINGS

The various features, advantages and other uses of the present apparatus will become more apparent by referring to the following detailed description and drawing in which.

DETAILED DESCRIPTION OF THE EMBODIMENTS

Figure 1:
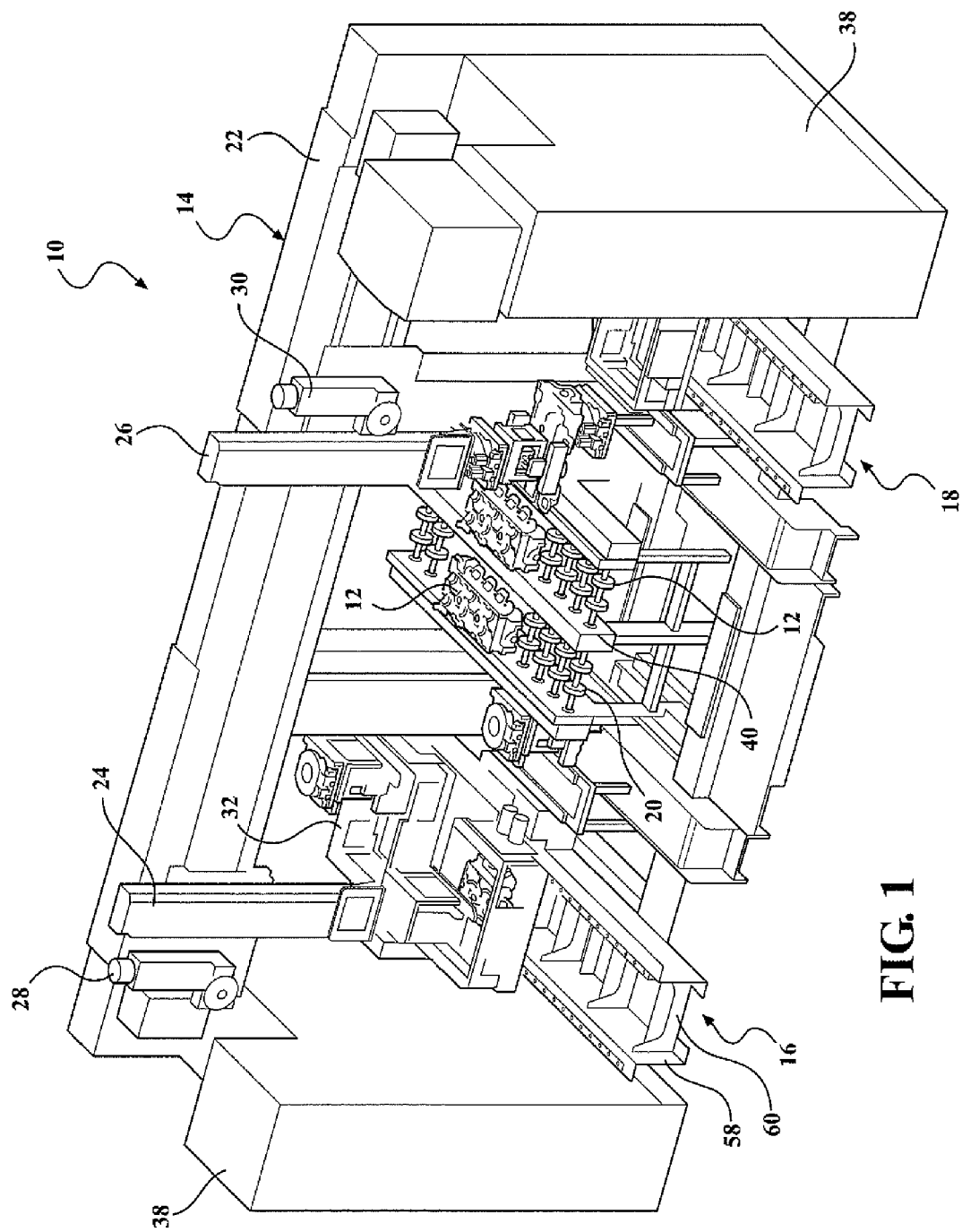
FIG. 1 is a perspective view of the flexible leak test apparatus and method of the present inventions.

Referring to the drawings, the present invention will now be described in detail with reference to the disclosed embodiment.

The present invention provides for a flexible leak test apparatus and method for leak testing various components or workpieces having multiple geometric configurations, such as cylinder heads for automobile engines. Cylinder heads of automobile engines have internal cylinders and apertures extending therefrom, which must be leak tested prior to assembling such components into an engine. Although the present invention is highly suited for cylinder heads of an automobile engine, the present invention is not limited in scope to cylinder heads of automobile engines, but rather, the present invention may be utilized to leak test other various components of automobiles such as clutches, transmission parts, water and vacuum pumps, and cylinder blocks. In addition, the present invention may be utilized on any non-automotive components that require leak testing.

As seen in FIG. 1, the flexible leak test apparatus and method 10 of the present invention provides for the leak testing of various workpieces 12, such as a cylinder head of an automobile engine as previously described. The flexible leak test apparatus and method 10 provides a workstation or cell 14 having a first side 16 and a second side 18 that are substantially similar. Both the first side 16 and the second side 18 of the workstation 14 have the ability to independently leak test different workpieces 12 so as to double the rate of the leak testing. In addition, if either the first side 16 or the second side 18 of the workstation 14 requires maintenance, the other first or second side 16, 18 may continue to leak test workpieces 12.

To provide the apparatus 10 with workpieces 12, the workpieces 12 are delivered to the workstation 14 via a roller conveyor 20. An overhead gantry 22 extends across both sides 16, 18 of the workstation 14 and supports a pair of independently-driven, substantially similar robotic arms 24, 26. The robotic arms 24, 26 are power driven by electric drives 28, 30 along X and Y axes, although it is anticipated that the robotic arms 24, 26 may also be driven in the X, Y, and Z axes. The robotic arm 24 services the first side 16 of the workstation 14, and the robotic arm 26 services the second side 18 of the workstation 14. Each robotic arm 24, 26 may be utilized to engage a workpiece 12 on the conveyor 20, thereby engaging and moving the workpiece 12 to a leak test fixture 32. Each leak test fixture 32 has a bottom portion or nest 34 by which to receive the workpiece 12. A top portion 36 of the leak test fixture 32 complementarily engages the bottom portion 34 of the leak text fixture 32 when leak testing the workpiece 12. Once the workpiece 12 is fixtured within the leak test fixture 32, leak testing of the workpiece 12 may be performed. Diagnostics and measurements are made by sensors (not shown) during the leak testing of the workpiece 12 and are sent electronically to programmable controllers and computers 38 that are positioned in enclosures on both ends of the workstation 14. The programmable controller and/or computers 38 provide all instructions and signals to all components of the flexible leak test apparatus and method 10. Once the leak testing of the workpiece 12 is completed, the robotic arms 24, 26 remove the workpiece 12 from the leak test fixture 32, and the workpiece 12 is placed on an outgoing roller conveyor 40. The workpiece 12 may then be sent to another workstation (not shown) for further processing, or the workpiece 12 may be segregated based on whether the workpiece 12 passes or fails the leak test.

Figure 2:
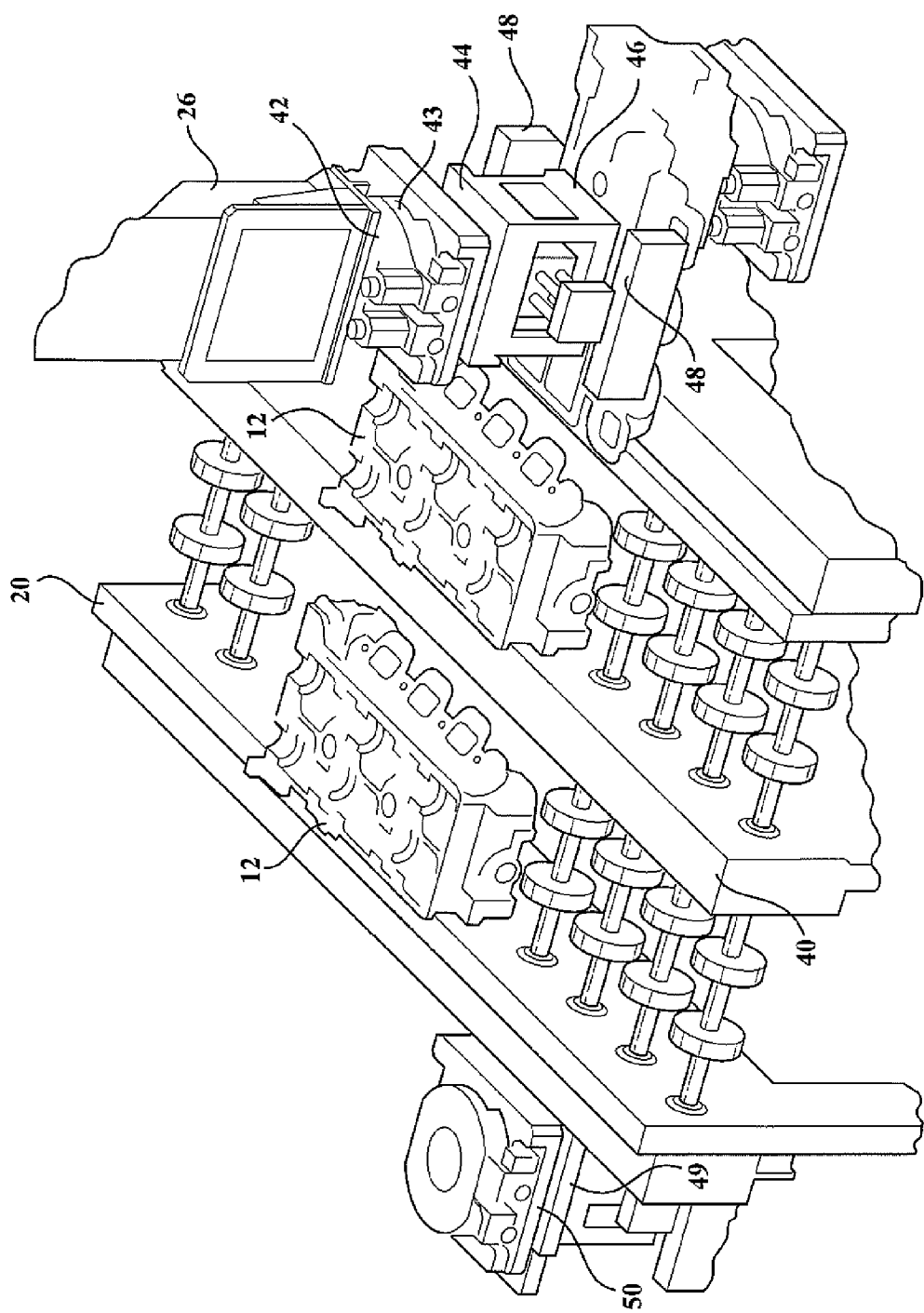
FIG. 2 is a perspective view of the conveyors and manipulators of the flexible leak test apparatus and method of the present inventions.
Figure 4:
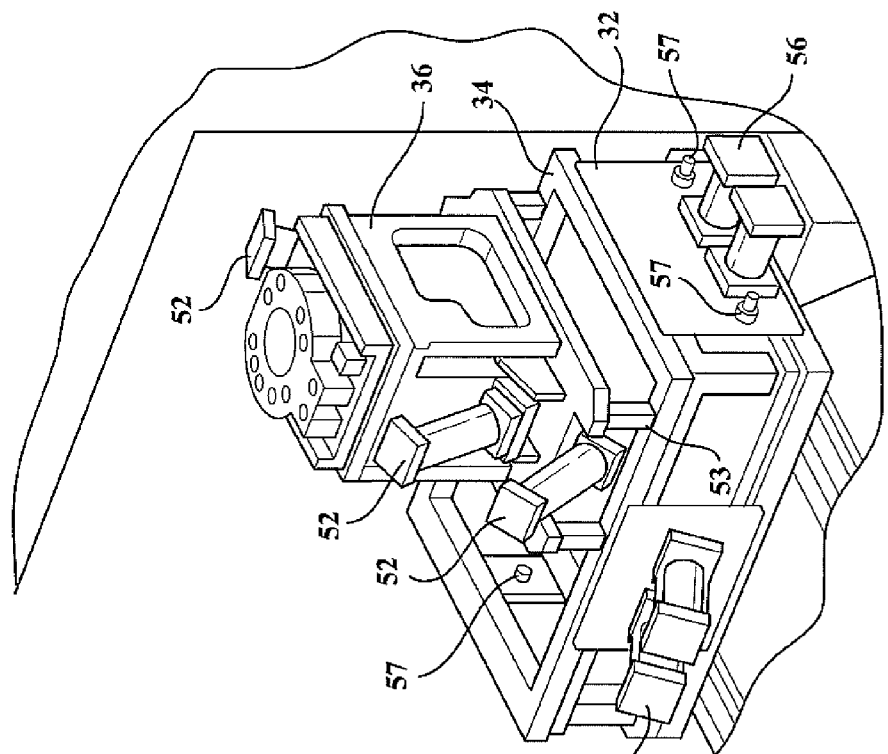
FIG. 4 is a perspective view of the leak test fixture of the flexible leak test apparatus and method of the present invention in the parked position.

In order to load the workpieces 12 into the leak test fixtures 32, the workpieces 12 enter the workstation 14 on the incoming conveyor 20, as previously described and as shown in FIG. 2. Each of the robotic arms 24, 26 have a quick disconnect mount 42 that allows for the automatic changing of a plurality of workpiece grippers 44 such that each workpiece gripper 44 has a mating quick disconnect mount 43 for complementarily engaging the quick disconnect mount 42 of the robotic arms 24, 26. Each workpiece gripper 44 is unique to each model or configuration of the workpiece 12, as the workpiece gripper 44 has a face portion 46 that complementarily engages a central portion of the workpiece 12 and a pair of actuating side clamps 48 that engage and disengage the sides of the workpiece 12. Since each workpiece gripper 44 is unique to the particular model of the workpiece 12, the robotic arms 24, 26 automatically change the workpiece gripper 44 to a different workpiece gripper 50, should the model of the workpiece 12 change. The workstation 14 provides a rack or table 49 for which additional workpiece grippers 50 may be stored when not in use. The robotic arms 24, 26 engage the workpiece 12 by the workpiece gripper 44 and move the workpiece 12 to the bottom portion 34 of the leak test fixture 32 wherein the workpiece 12 is loaded into the bottom portion 34 of the leak test fixture 32.

When the workpiece 12 is loaded into the bottom portion 34 of the leak test fixture 32, the workpiece 12 is positioned on the floor of the bottom portion 34 of the leak test fixture 32, as seen in FIGS. 3-7. The bottom portion 34 of the leak test fixture 32 has a substantially rectangular configuration, wherein the bottom surface of the workpiece 12 matingly engages substantially circular fire deck seals 51 on the floor of the bottom portion 34 of the leak test fixture 32 to seal the openings in the bottom surface of the workpiece 12. When loading the workpiece 12 into the bottom portion 34 of the leak test fixture 32, the top portion 36 of the leak test fixture 32 rests on four small, substantially rectangular posts 53 extending upward from the bottom portion 34 of the leak test fixture 32. The top portion 36 of the leak test fixture 32 also has a substantially rectangular configuration with pneumatic cylinders or linear actuators 52 connected thereto. The top portion 36 of the leak test fixture 32 also provides a quick disconnect mount 54, which complementarily engages the quick disconnect mount 42 of the robotic arms 24, 26 to automatically engage and disengage the top portion 36 of the leak test fixture 32. Once the robotic arm 24, 26 loads the workpiece 12 into the bottom portion 34 of the leak test fixture 32, the robotic arm 24, 26 disengages the workpiece 12 with the workpiece gripper 44 and places and disengages the workpiece gripper 44 on the appropriate shelf or rack 49 in the workstation 14. The robotic arm 24, 26 returns to the top portion 36 of the leak test fixture 32 and engages the quick disconnect mount 54 on the top portion 36 of the leak test fixture 32. The robotic arm 24, 26 moves the top portion 36 of the leak test fixture 32 off the four posts 53 of the bottom portion 34 of the leak test fixture 32 from the parked position to the test position wherein the top portion 36 is aligned with the bottom portion 34 on the leak test fixture 32 to engage the workpiece 12. The bottom portion 34 of the leak test fixture 32 also has pneumatic cylinders or linear actuators 56 mounted to the sides of the leak test fixture 32 similar to the pneumatic cylinders 52 provided on the top portion 36 of the leak test fixture 32. The pneumatic cylinders 52, 56 are connected to plugs and seals that extend outward to engage and plug corresponding apertures and cylinders in the workpiece 12 when the pneumatic cylinders 52, 56 are actuated. When this occurs, a pressurized fluid source (not shown) provides pressurized air to at least one internal cylinder or cavity of the workpiece 12 in order to test the internal cylinder or cavity of the workpiece 12 for leaks. The pressurized air may be directed to the workpiece 12 through ports 57 in the ends of the bottom portion 34 of the leak test fixture 32 or through the pneumatic cylinders 52, 56 in the leak test fixture 32. Sensors 59 within the leak test fixture 32 either measure the air pressure within the internal cavity or cylinder of the workpiece 12 for decay, or the sensors 59 monitor the flow rate of pressurized air traveling into the cavity or cylinder and communicate the measurements to the computer 38. If the air pressure within the internal cylinder or cavity of the workpiece 12 drops below a predetermined level during a predetermined time period or the flow rate exceeds a predetermined level, then the workpiece 12 is deemed to have a leak. If the air pressure within the internal cylinder or cavity of the workpiece 12 does not drop within a predetermined time period, or the flow rate does not exceed a predetermined level, then the workpiece 12 does not have a leak, and the workpiece 12 is acceptable. These determinations are made by conventional programming in the computer 38.

Once the leak test is completed, the robotic arm 24, 26 moves the top portion 36 of the leak test fixture 32 back on the four posts 53 extending from the bottom portion 34 of the leak test fixture 32 to the parked position. The robotic arm 24, 26 releases the top portion 36 of the leak test fixture 32 at the quick disconnect mount 42 and moves to reconnect to the workpiece gripper 44. The robotic arm 24, 26 utilizes the workpiece gripper 44 to engage the workpiece 12 from the bottom portion 34 of the leak test fixture 32 and moves the workpiece 12 to the outgoing conveyor 40. Depending on the flow of workpieces 12, the workpieces 12 may be segregated into acceptable and non-acceptable workpieces 12 based on the results of the leak test.

Figure 3:
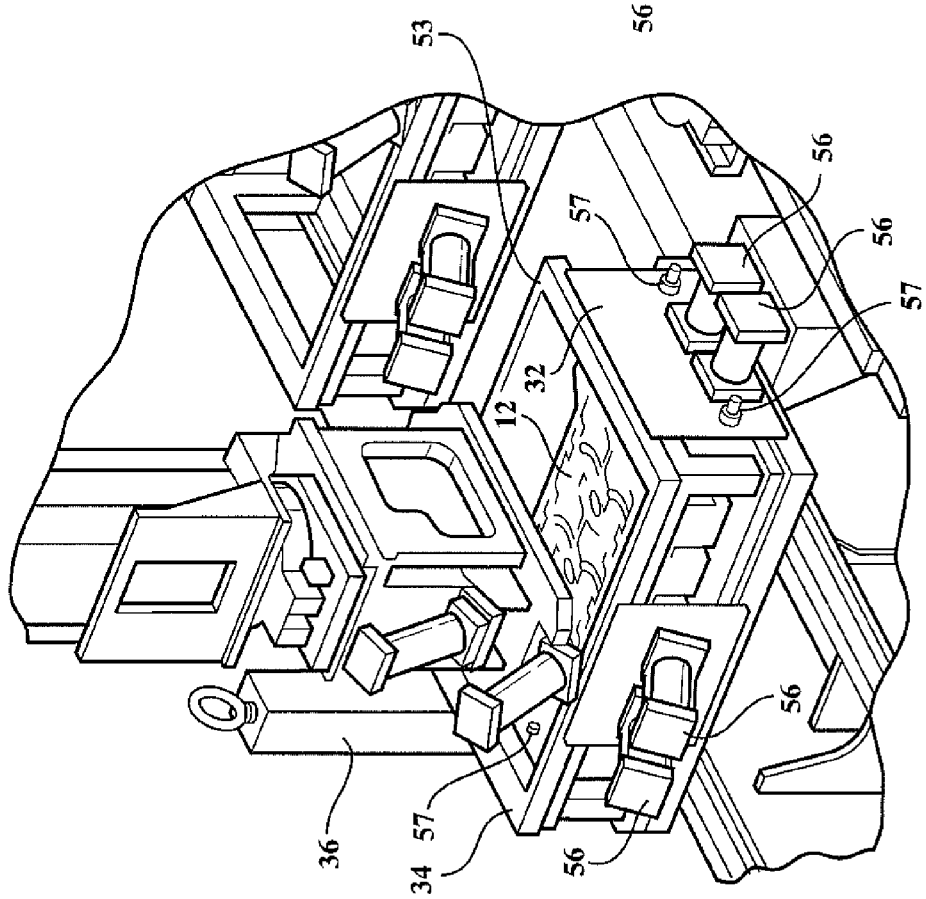
FIG. 3 is a perspective view of the leak test fixture of the flexible leak test apparatus and method of the present inventions in the test position.
Figure 5:
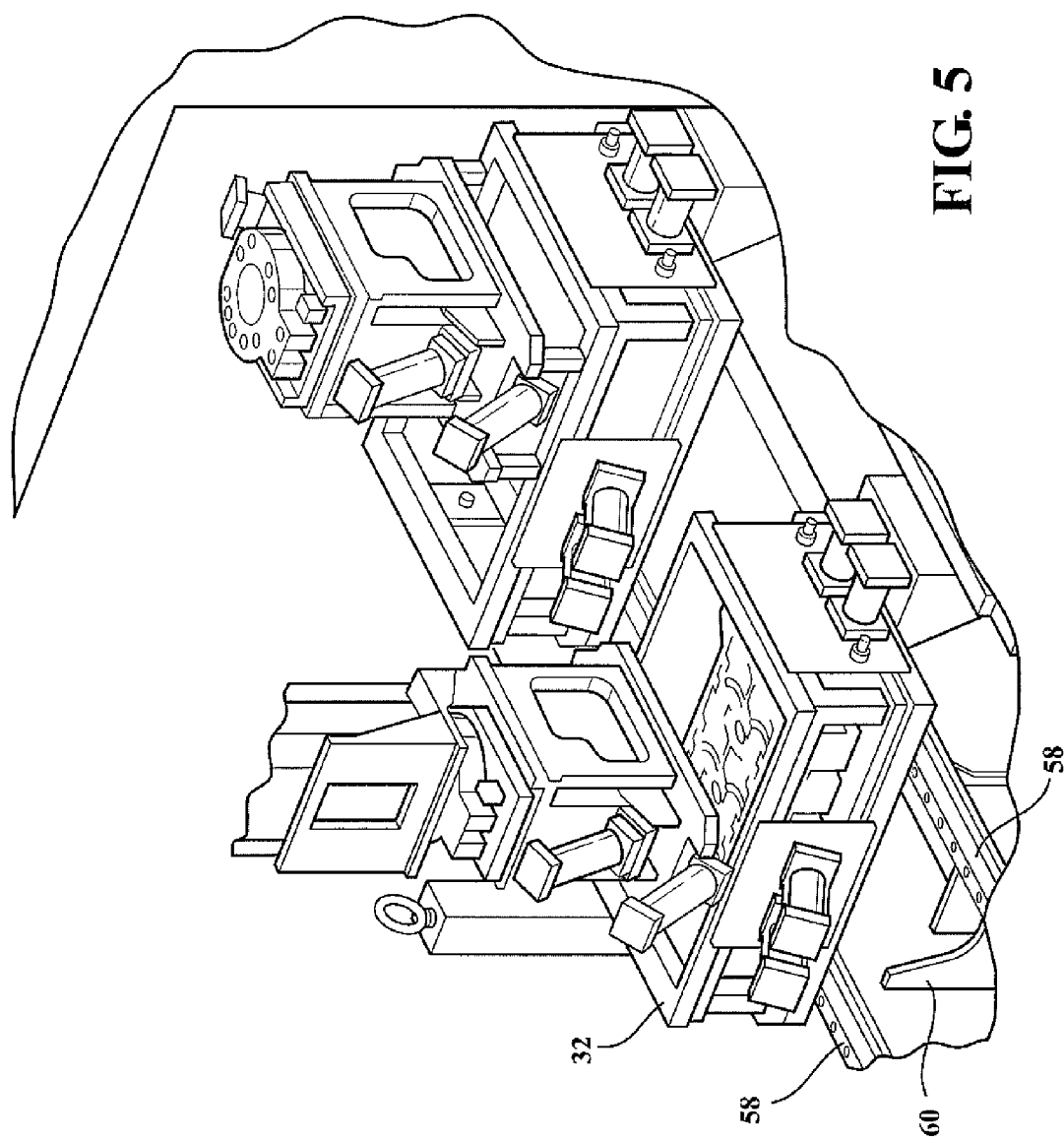
FIG. 5 is a perspective view of the leak text fixture shuttle of the flexible leak test apparatus and method of the present invention.
Figure 6:
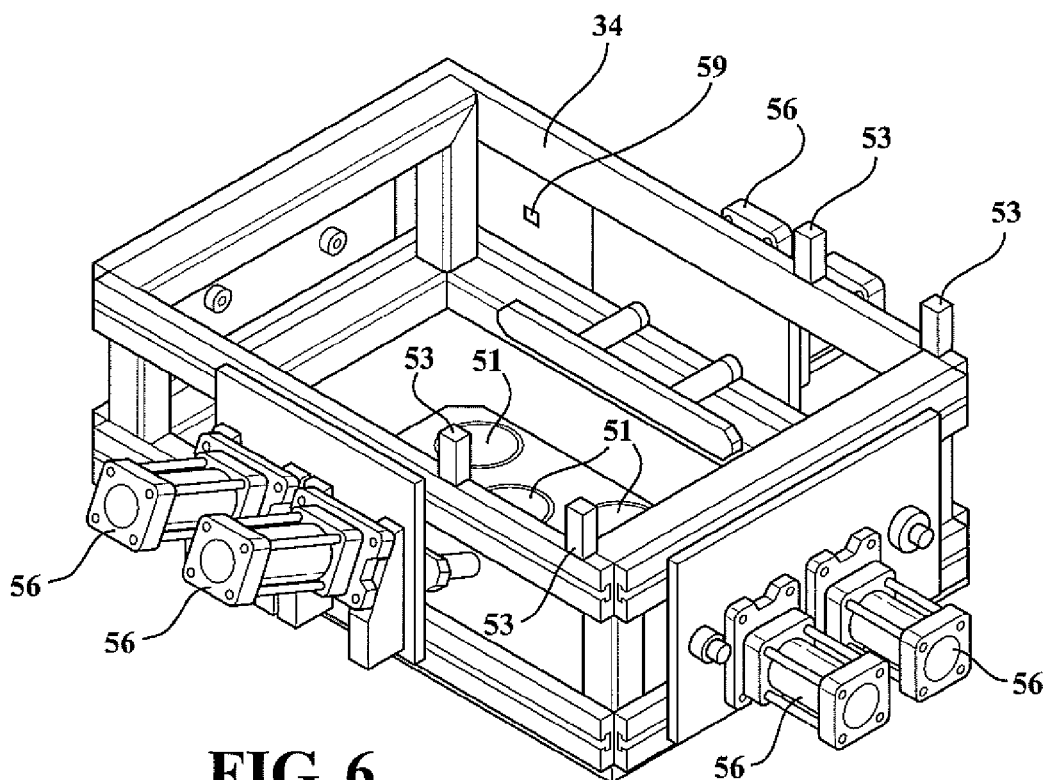
FIG. 6 is a perspective view of the bottom portion of the leak test fixture of the flexible leak test apparatus and method of the present invention.
Figure 7:
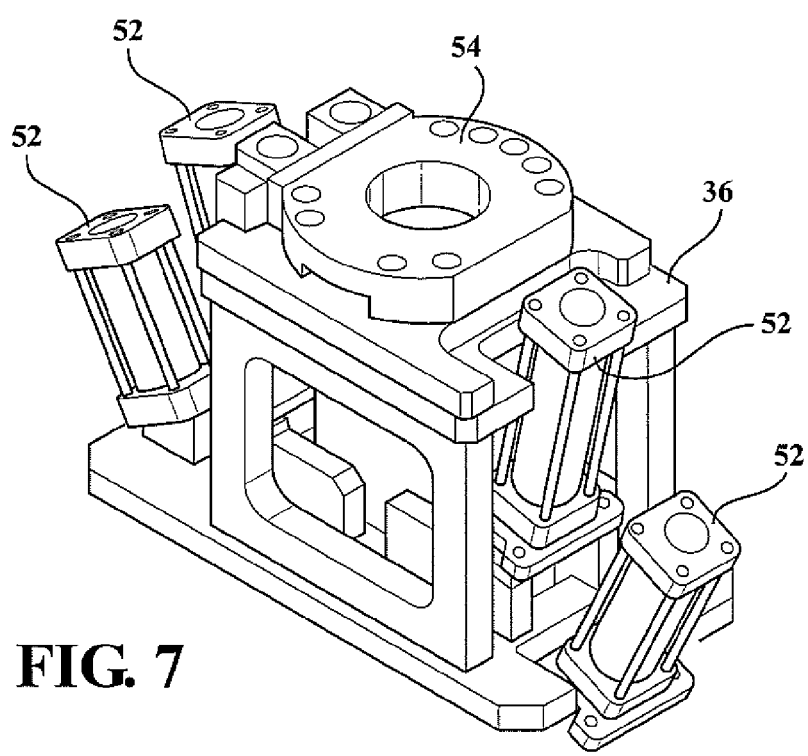
FIG. 7 is a perspective view of the top portion of the leak test fixture of the flexible leak test apparatus and method of the present invention.

In order to accommodate different model workpieces 12 having multiple geometric configurations, the workstation 14 houses different leak test fixtures 32 that are dedicated to different model workpieces 12 having different geometric configurations. As seen in FIGS. 1, 3, and 5, a pair of leak test fixtures 32 are mounted on a pair of rails 58 that allow the leak test fixtures 32 to slide or move thereon. Any number of leak test fixtures 32 may be stored on the rails 58 depending on the length of the rails 58 and the number of different workpieces 12 anticipated. A shuttle drive system 60 is mounted below the rails 58 to allow for movement of the leak test fixtures 32 along the rails 58. Upon inputting the appropriate model workpiece 12, the computer 38 provides the shuttle drive system 60 with the appropriate instructions for moving the appropriate leak text fixture 32 to the leak test position. By allowing the workstation 14 of the present invention to provide numerous leak test fixtures 32 and workpiece grippers 44, 50, the flexible leak test apparatus and method 10 of the present invention may leak test various models of workpieces 12 having different geometric configurations in the same workstation 14.

Figure 8:
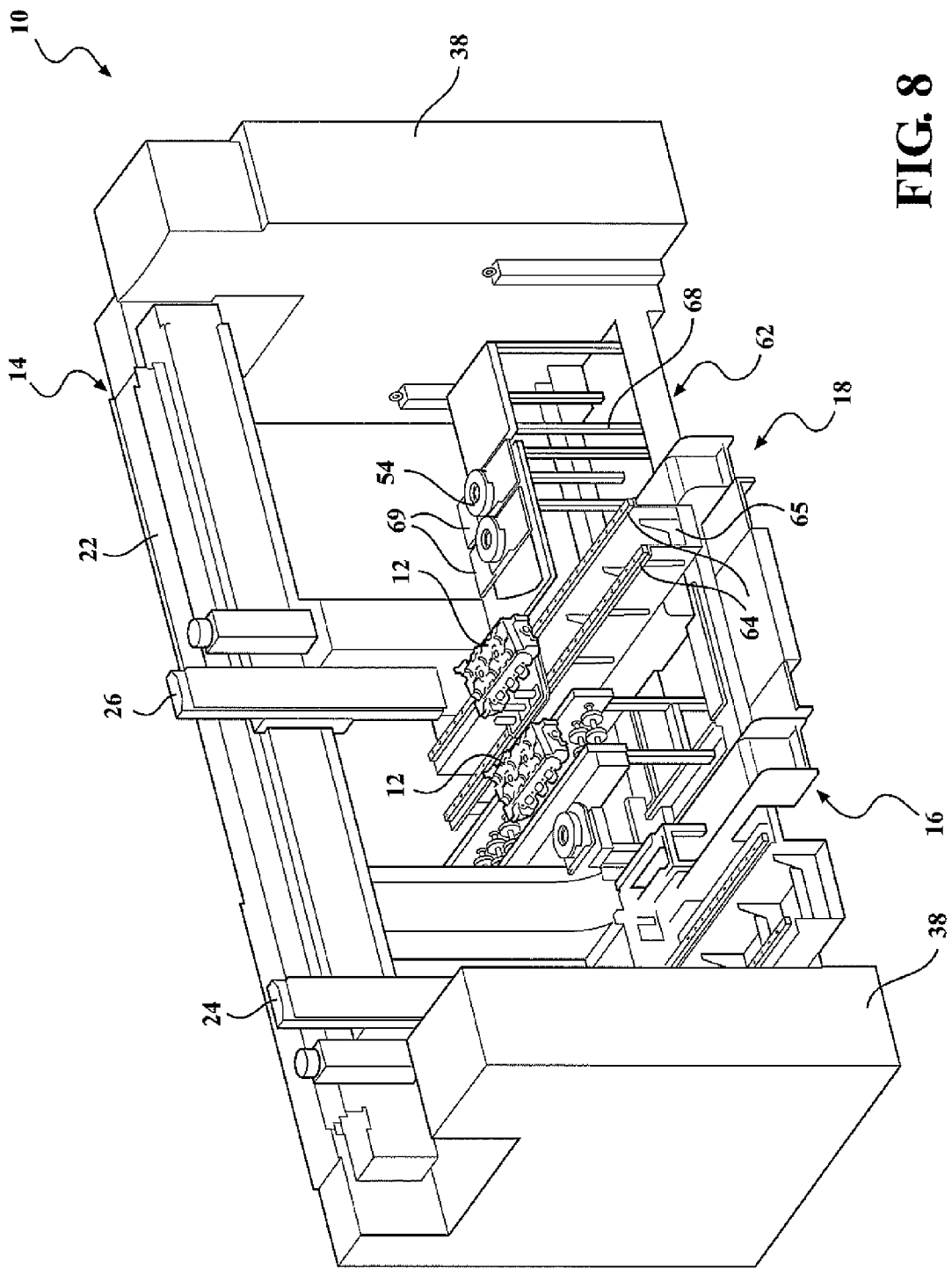
FIG. 8 is a perspective view of a second embodiment of the flexible leak test apparatus and method with a press operation included therein.
Figure 9:
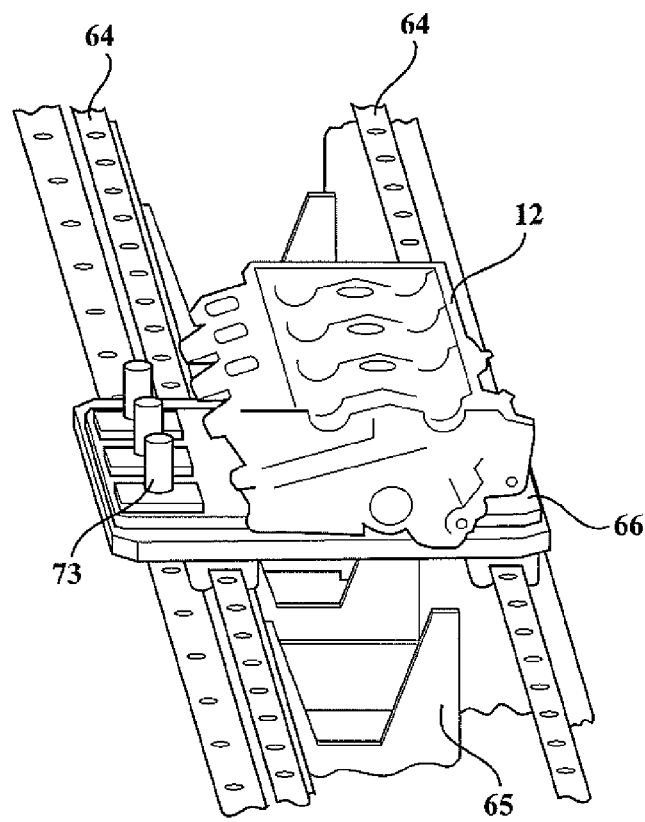
FIG. 9 is a perspective view of a fixture plate of the second embodiment of the flexible leak test apparatus and method of the present invention.
Figure 10:
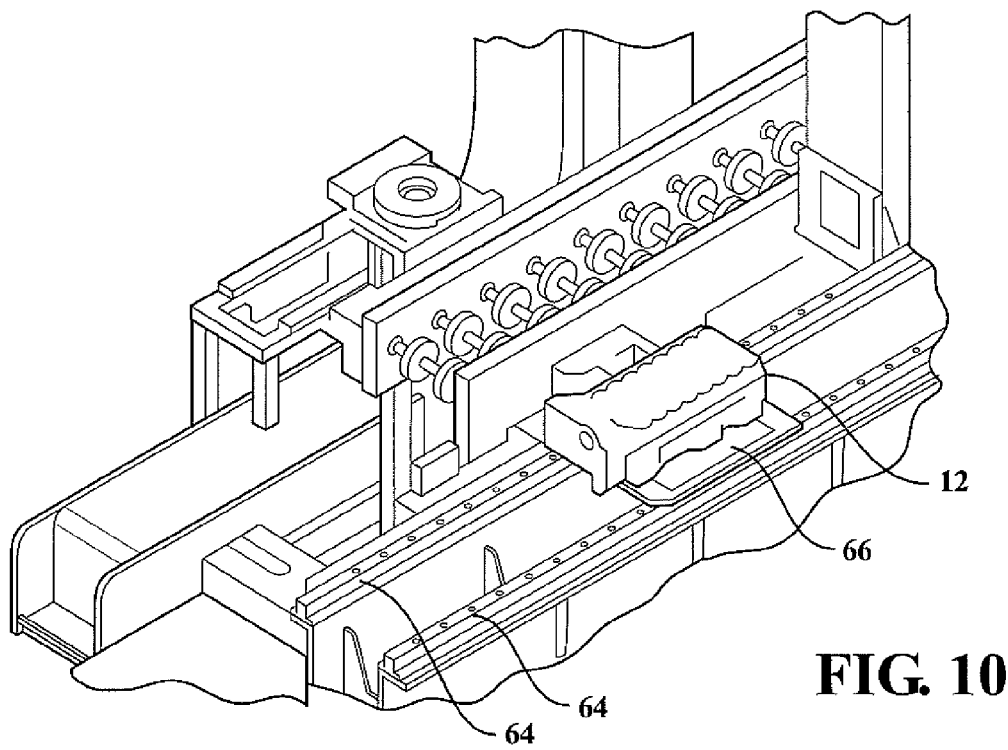
FIG. 10 is a perspective view showing the leak test fixture and press fixture of the second embodiment of the flexible leak test apparatus and method of the present invention.

In another embodiment of the present invention, the flexible leak test apparatus and method 10 may incorporate a pressing station 62 into one side 16, 18 of the workstation 14 while the opposite side 16, 18 of the workstation 14 provides the leak test operation, as previously described. The pressing station 62 may perform any number of pressing functions on any number or types of workpieces 12. As shown in FIGS. 8-10, the pressing station is shown pressing cap plugs (not shown) and spark plug sleeves (not shown) in the workpiece 12 or cylinder head. The pressing station 62 is incorporated into the second side 18 of the workstation 14, as the workstation 14 still provides the robotic arm 26 and the gantry 22 along with the computer 38. The pressing station 62 provides a pair of substantially parallel rails 64 with an interchangeable fixture plate 66 slidably connected to the rails 64. The fixture plate 66 is designed to complementarily receive a specific model workpiece 12; however, other fixture plates 66 may be stored on the rails 64 for receiving other various models of the workpiece 12 having different geometric configurations. As similarly described for the leak test fixtures 32, a shuttle system 65 is mounted below the rails 64 for moving the proper fixture plate 66 into position. As previously described, the robotic arm 26 uses the workpiece gripper 44 to engage the workpiece 12 from the conveyor 20 and lift and place the workpiece 12 onto the fixture plate 66.

Figure 11:
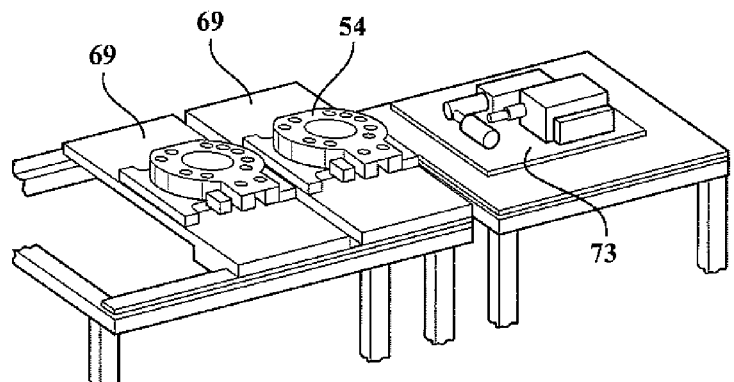
FIG. 11 is a perspective view showing the press tool stand of the second embodiment of the flexible leak test apparatus and method of the present invention.
Figure 12:
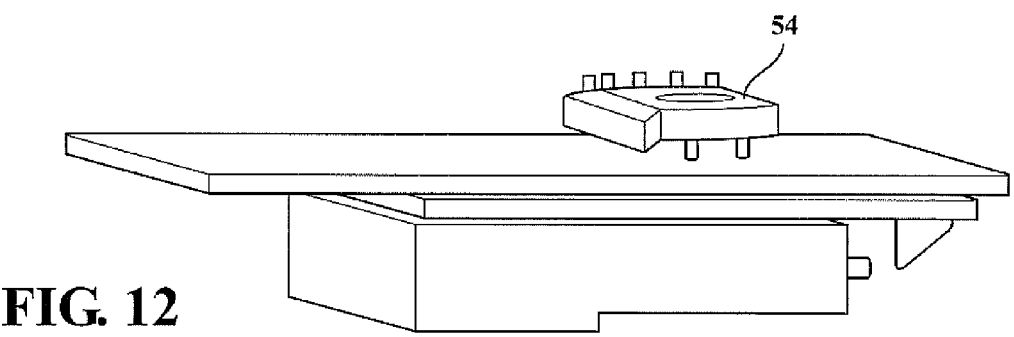
FIG. 12 is a perspective view of a press tool of the second embodiment of the flexible leak test apparatus and method of the present invention.
Figure 13:
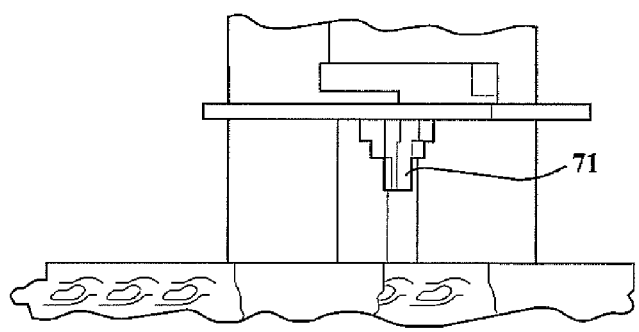
FIG. 13 is a side view of a spark plug sleeve pick-up and press tool of the second embodiment of the flexible leak test apparatus and method of the present invention.

In order to assemble the cup plugs and spark plug sleeves into the workpiece 12, the press station 62 provides various press tools 69 adjacent to the rails 64. Tables or stands 68 are utilized to support the press tools 69 when not in use. Each of the press tools 69 have a quick disconnect mount 54 so that the robotic arm 26 may automatically engage and disengage the press tools 69. One of the press tools 69 provides a spark plug sleeve pickup and press tool 71, as seen in FIG. 13, wherein spark plug sleeves are picked up from posts 73 that are stored on the fixture plate 66, as seen in FIG. 9. The robotic arm 26 utilizes the tube pick up and press tool 71 to engage and insert the spark plug sleeves into the spark plug openings of the workpiece 12. The robotic arm 26 then engages a press tool 69 to press the spark plug sleeves into the workpiece 12. A programmable lock tight spinner 73, as shown in FIG. 11, may also be provided for applying an adhesive to the cup plugs prior to assembling the cup plugs to the workpiece 12.

Figure 14:
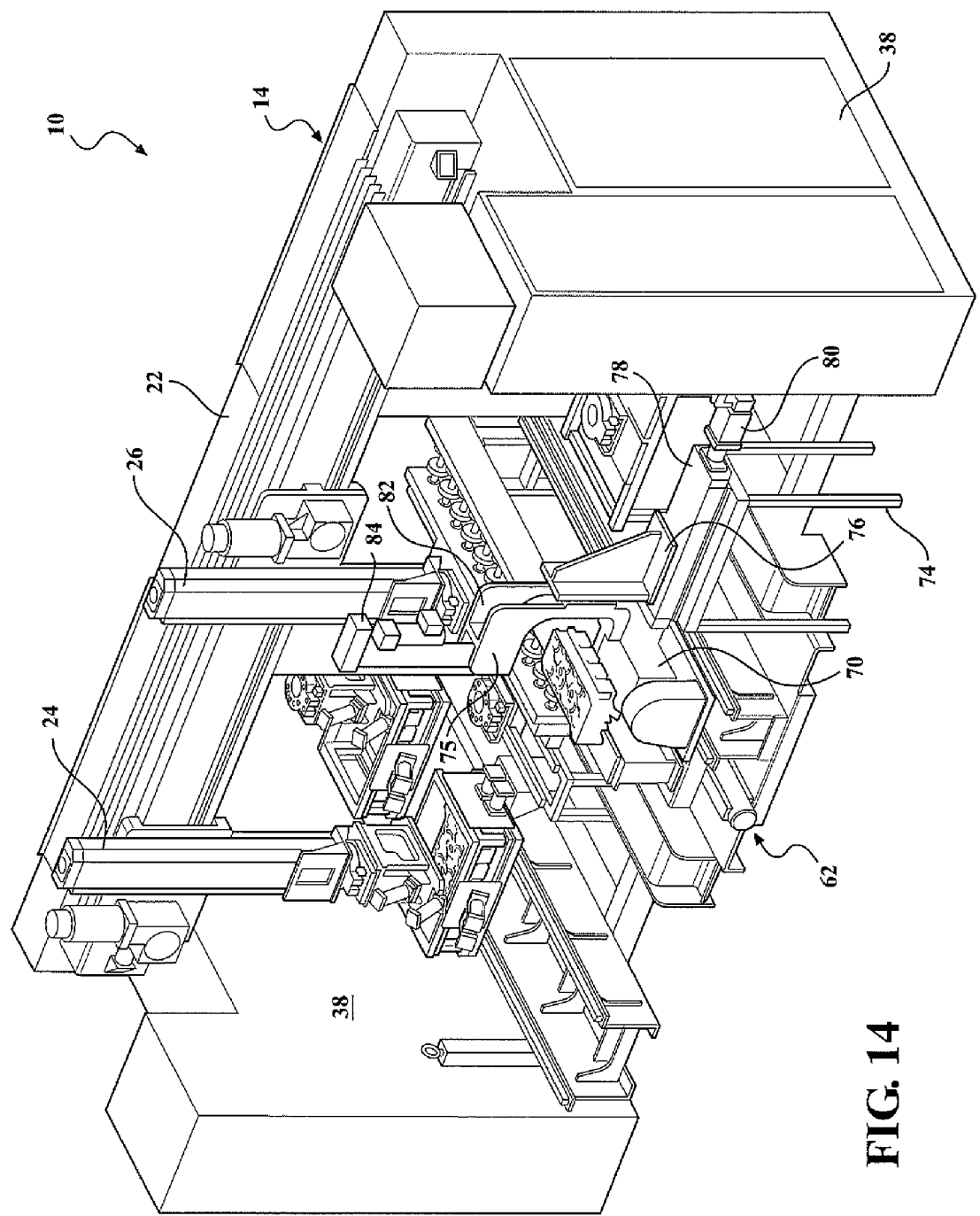
FIG. 14 is a perspective view of the second embodiment of the flexible leak test apparatus and method of the present invention having a high force press.
Figure 16:
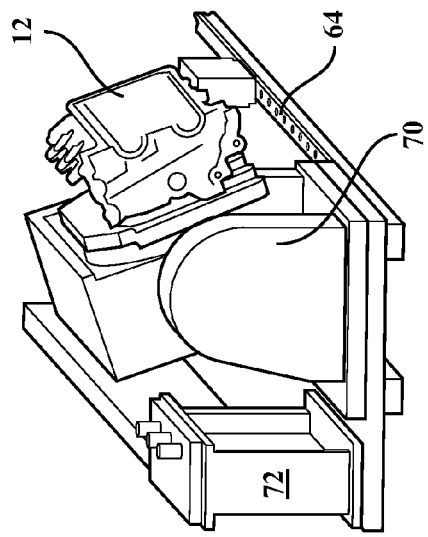
FIG. 16 is a perspective view of the rotatable press fixture of the second embodiment of the flexible leak test apparatus and method of the present invention.
Figure 15:
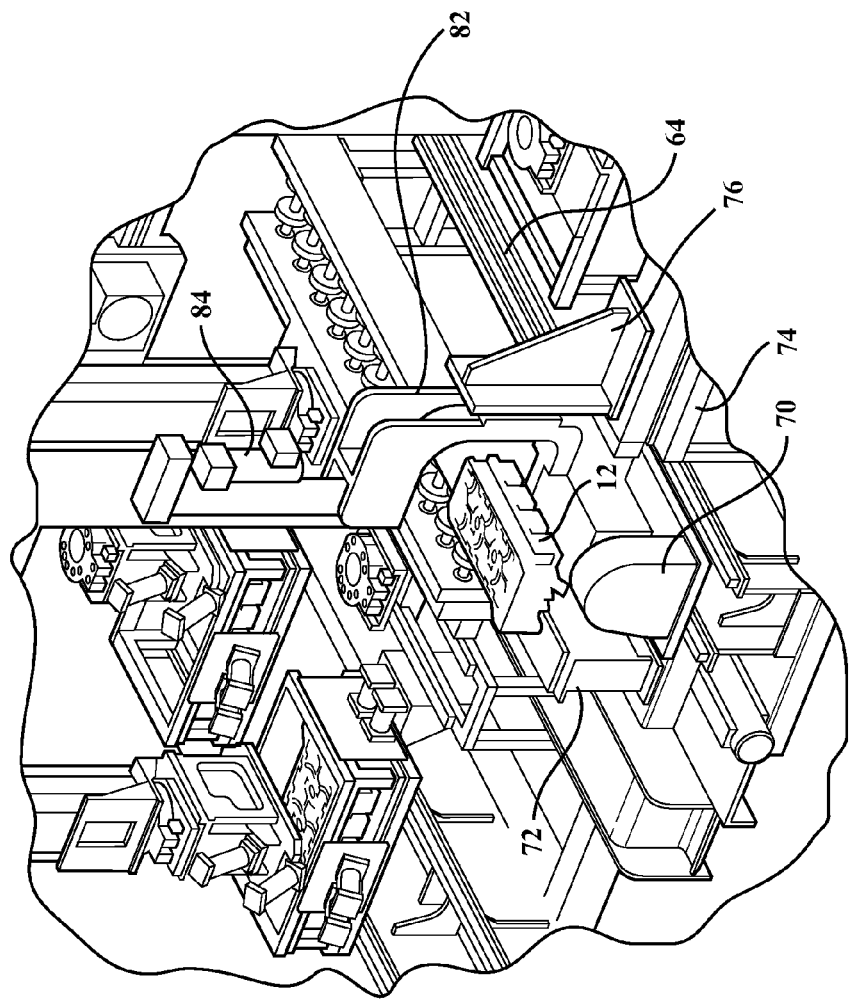
FIG. 15 is a perspective view of the high force press and rotatable fixture of the second embodiment of the flexible leak test apparatus and method of the present invention.

In another embodiment, a high-force press 75 is provided in the press station 62 of the flexible leak test apparatus and method 10, as seen in FIGS. 14-15. This embodiment utilizes a similar assembly and press operation on the second side 18 of the workstation 14, as described in the previous embodiment. In this embodiment, a rotatable pressing fixture 70 is utilized and mounted on the rails 64 of the press station 62. The robotic arm 26 utilizes the workpiece gripper 44 to place the workpiece 12 onto the pressing fixture 70. The pressing fixture 70 allows the workpiece 12 to rotate so that various sides of the workpiece 12 can be accessed except for the mounting face that is connected to the pressing fixture 70. A stand 72 adjacent the pressing fixture 70 is utilized to hold the cap plugs and the spark plug sleeves for assembling into the workpiece 12. The same press tools 69 are utilized as the previous embodiment. In this embodiment, the high-force press 75 is utilized to apply forces over 8 kilo-newtons. The high-force press 75 utilizes a table 74 for supporting a substantially L-shaped bracket 76 mounted on a slide 78. The slide 78 may be actuated through a linear actuator 80. A large substantially C-shaped bracket 82 is connected to the L-shaped bracket 76 and supports a high-force press 84 connected to the top of the C-shaped bracket 82. The press 84 has a ram (not shown) that extends downward and engages the appropriate spark plug sleeve or cap plug in the workpiece 12. The movement of the L-shaped bracket 76 on the slide 78 allows the C-shaped bracket 82 to slide in and out with respect to the workpiece 12 such that the bottom end of the C-shaped bracket 82 supports the workpiece 12 during the pressing operation. Once the pressing operation is complete, the robotic arm 24, 26 may engage and move the workpiece 12 to the leak test fixture 32, wherein the workpiece 12 may be leak tested, as previously described.

Figure 17:
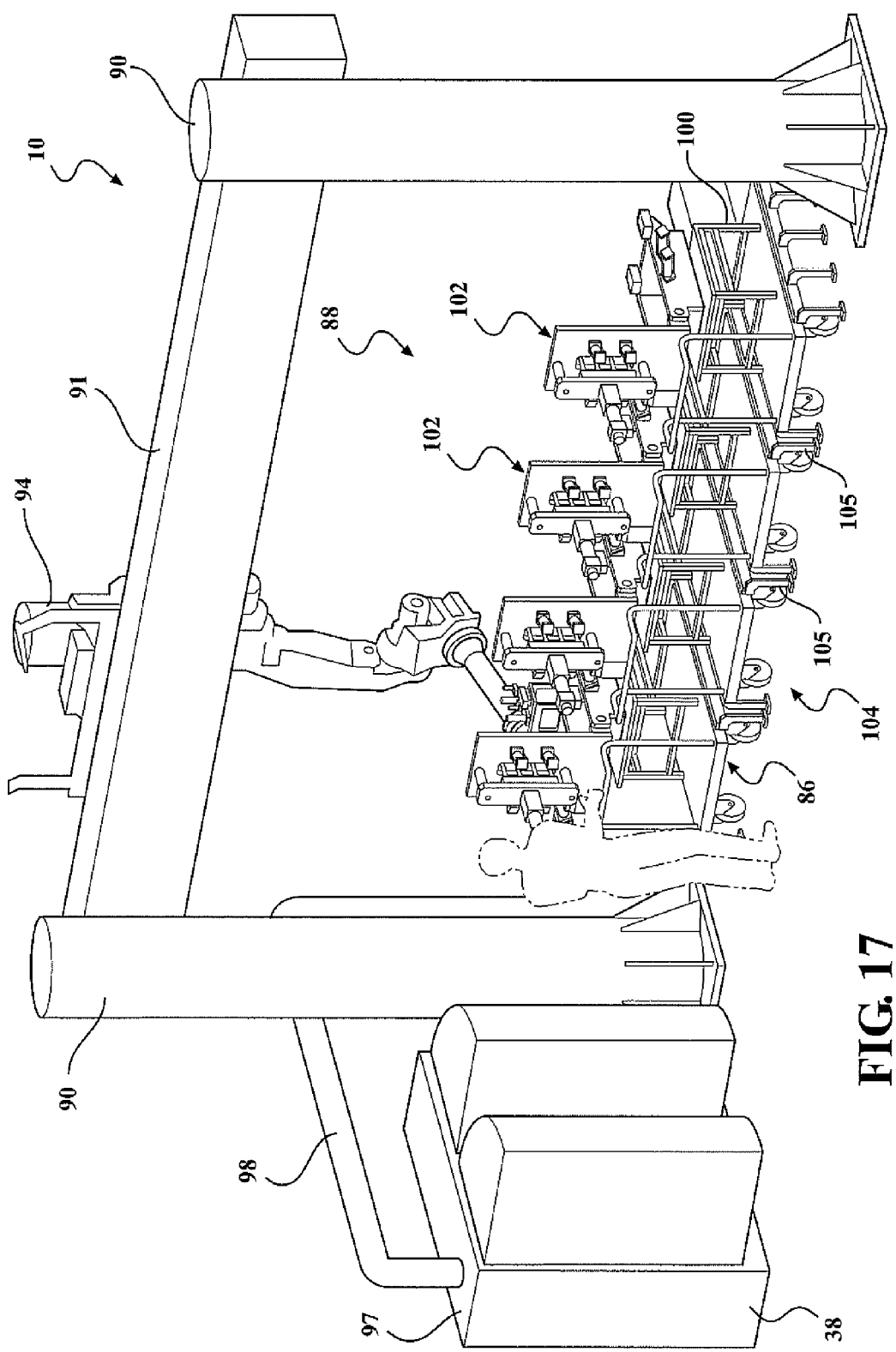
FIG. 17 is a perspective view of a third embodiment of the flexible leak test apparatus and method of the present invention using rollable carts.
Figure 18:
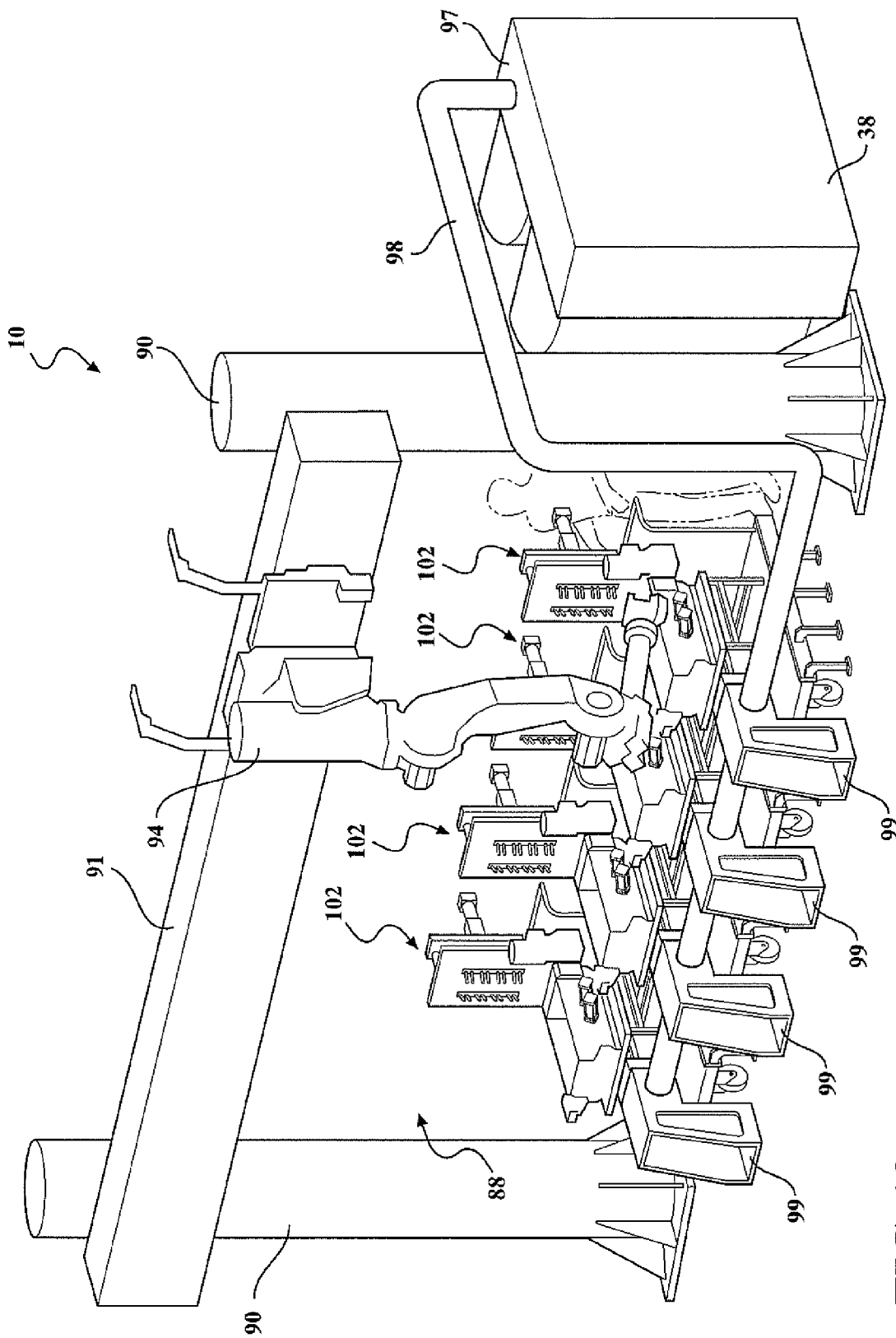
FIG. 18 is a perspective view of the communication duct of the third embodiment of the flexible leak test apparatus and method of the present invention.
Figure 19:
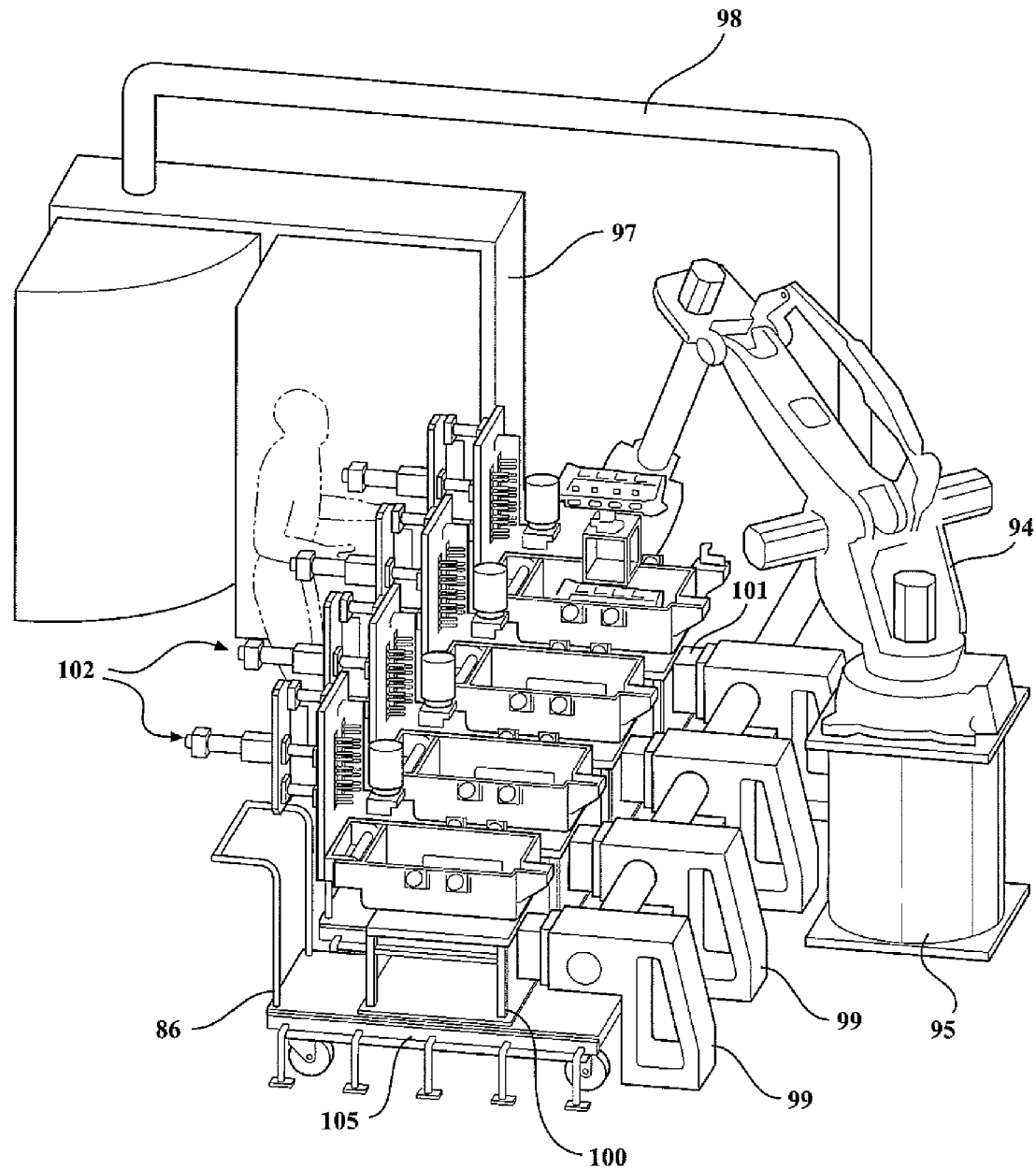
FIG. 19 is a perspective view of a manipulator of the third embodiment of the flexible leak test apparatus and method of the present invention.

In yet another embodiment, FIGS. 17-19 show the flexible leak test apparatus and method 10 of the present invention utilizing rollable carts 86 for transporting and supporting leak test fixtures 102. Each workstation 88 provides a pair of large columns 90 that support an overhead gantry 91 for supporting a robotic arm 94. In the alternative, the robotic arm 94 may be mounted to an independent base 95, as shown in FIG. 19. An electrical control panel 97 housing programmable controllers and computers 38 is mounted adjacent the workstation 88 so as to provide electrical communication to the workstation 88 through communication ducts 98. The communication ducts 98 house electrical wiring that is connected to match plates 99. The match plates 99 are in turn connected to a controller interface 101 on each cart 86. The controller interface 101 communicates with all controls on the leak test fixture 102, thereby communicating all diagnostics and measurements to the computers 38.

Figure 20:
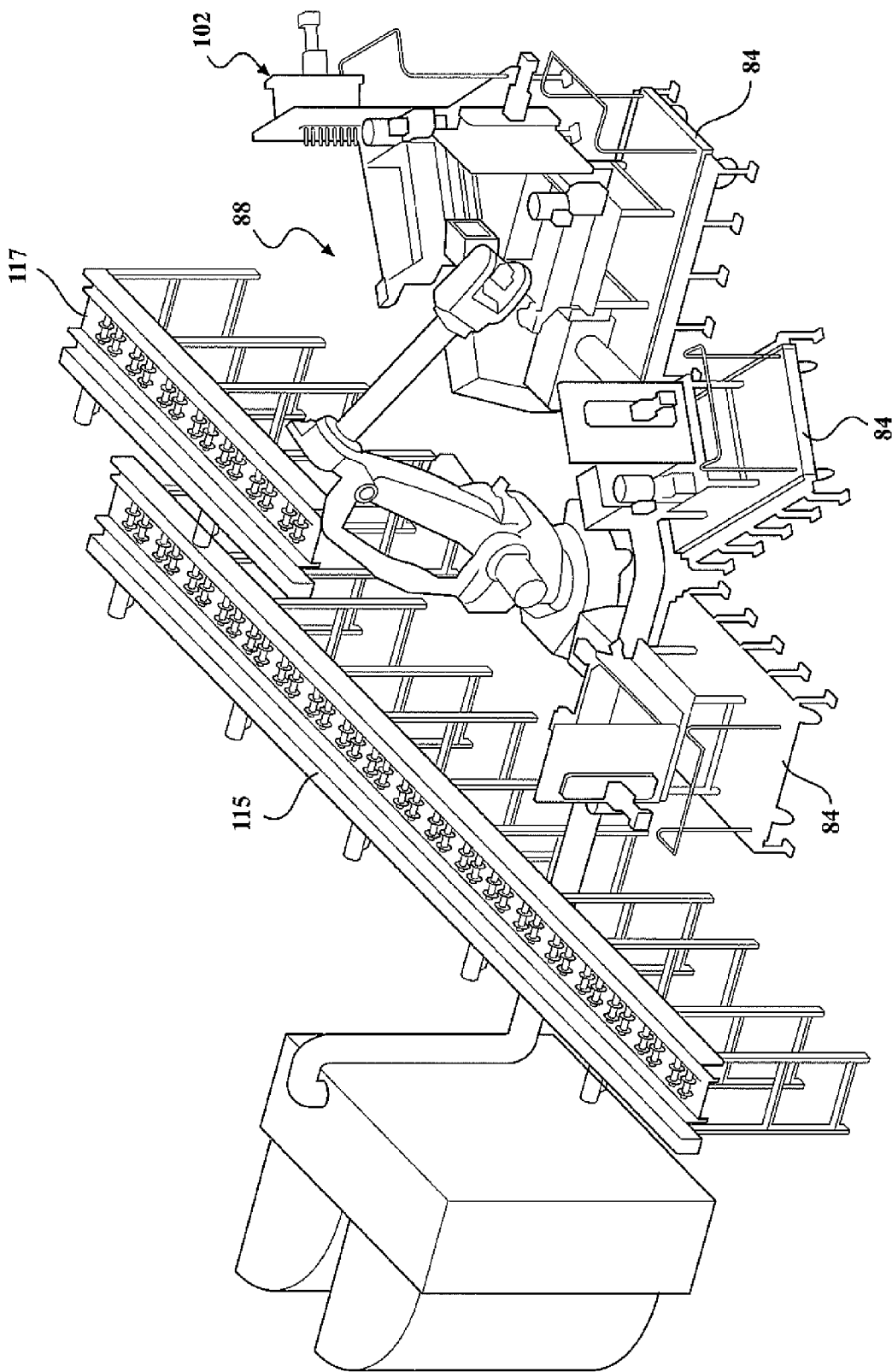
FIG. 20 is a perspective view of the third embodiment of the flexible leak test apparatus and method of the present invention showing the leak test fixtures in a semi-circular configuration.
Figure 21:
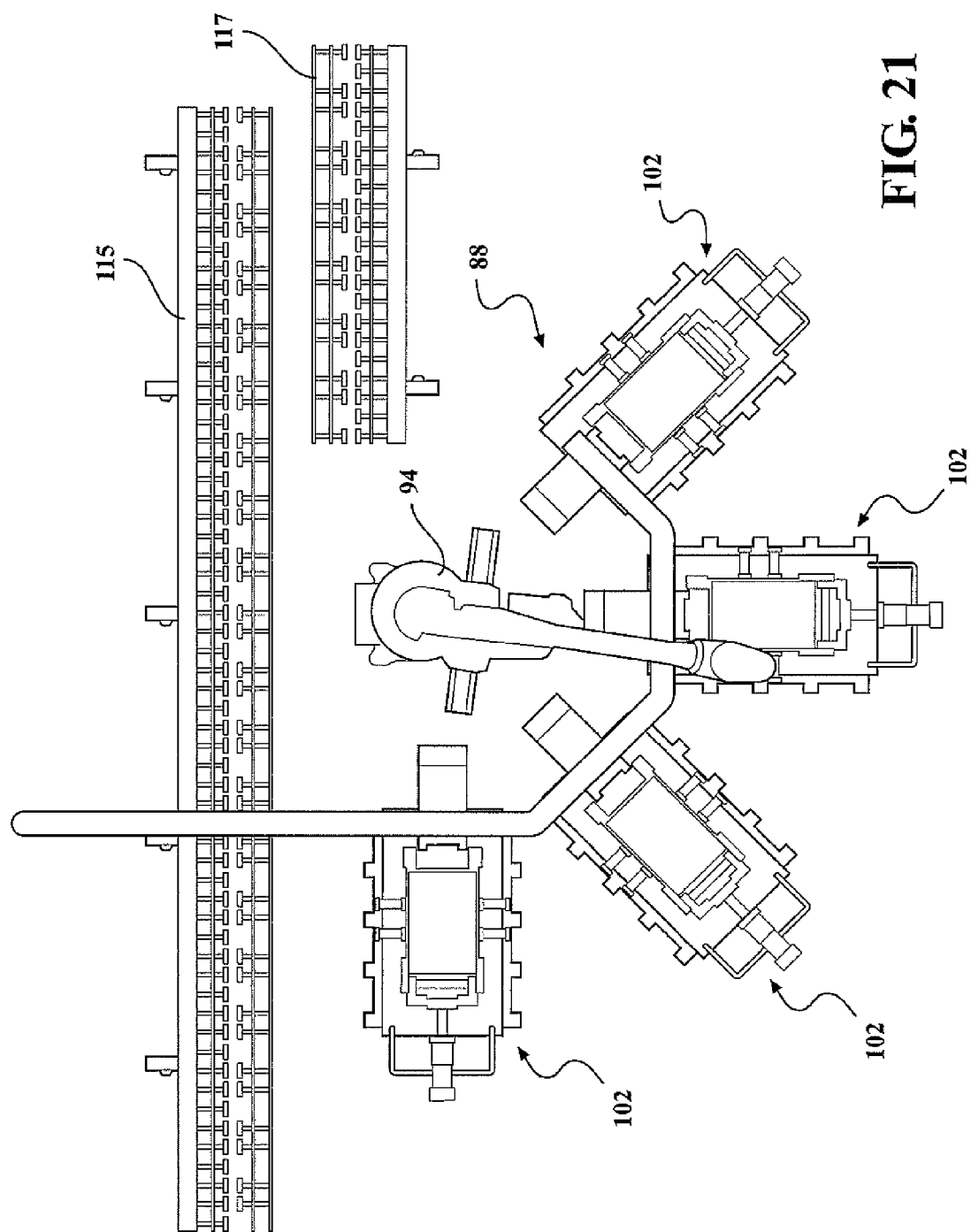
FIG. 21 is an overhead view of the third embodiment of the flexible leak test apparatus and method of the present invention with the leak test fixtures in a semi-circular configuration.
Figure 22:
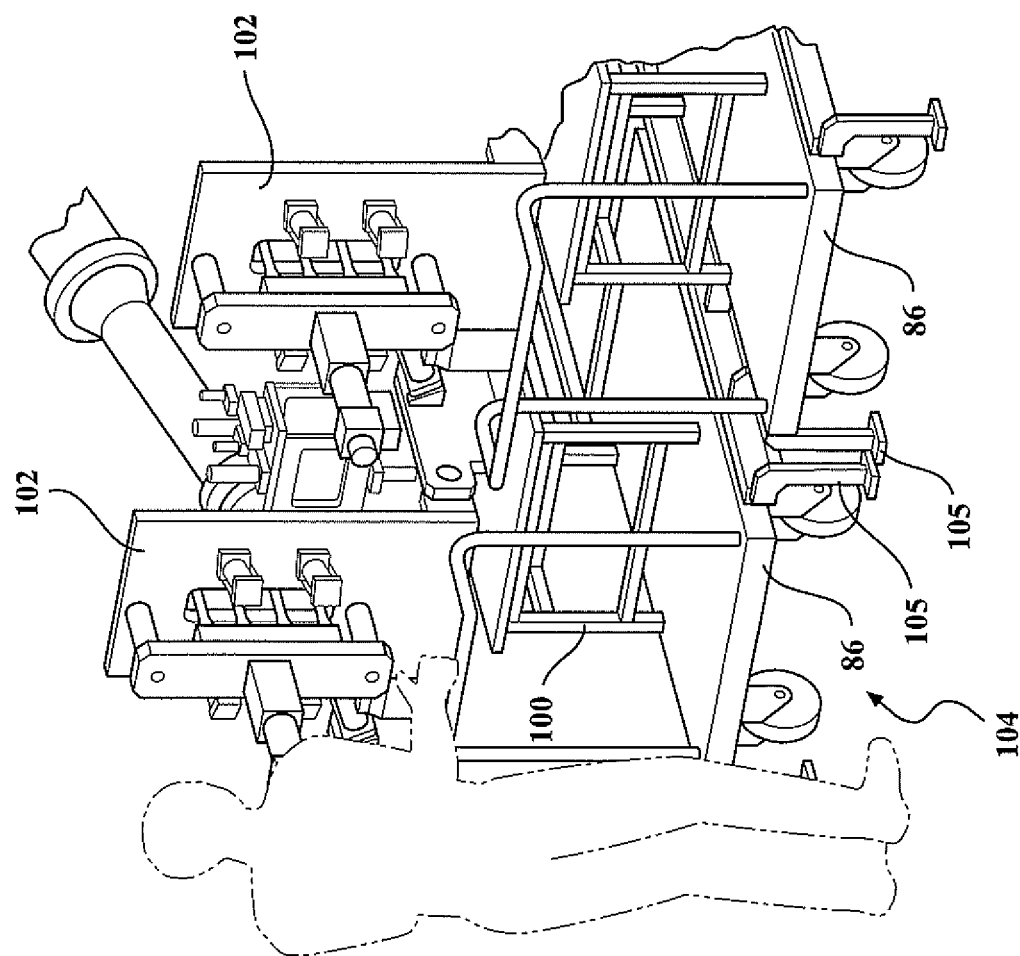
FIG. 22 is a perspective view of the carted leak test box of the third embodiment of the flexible leak test apparatus and method of the present invention.
Figure 23:
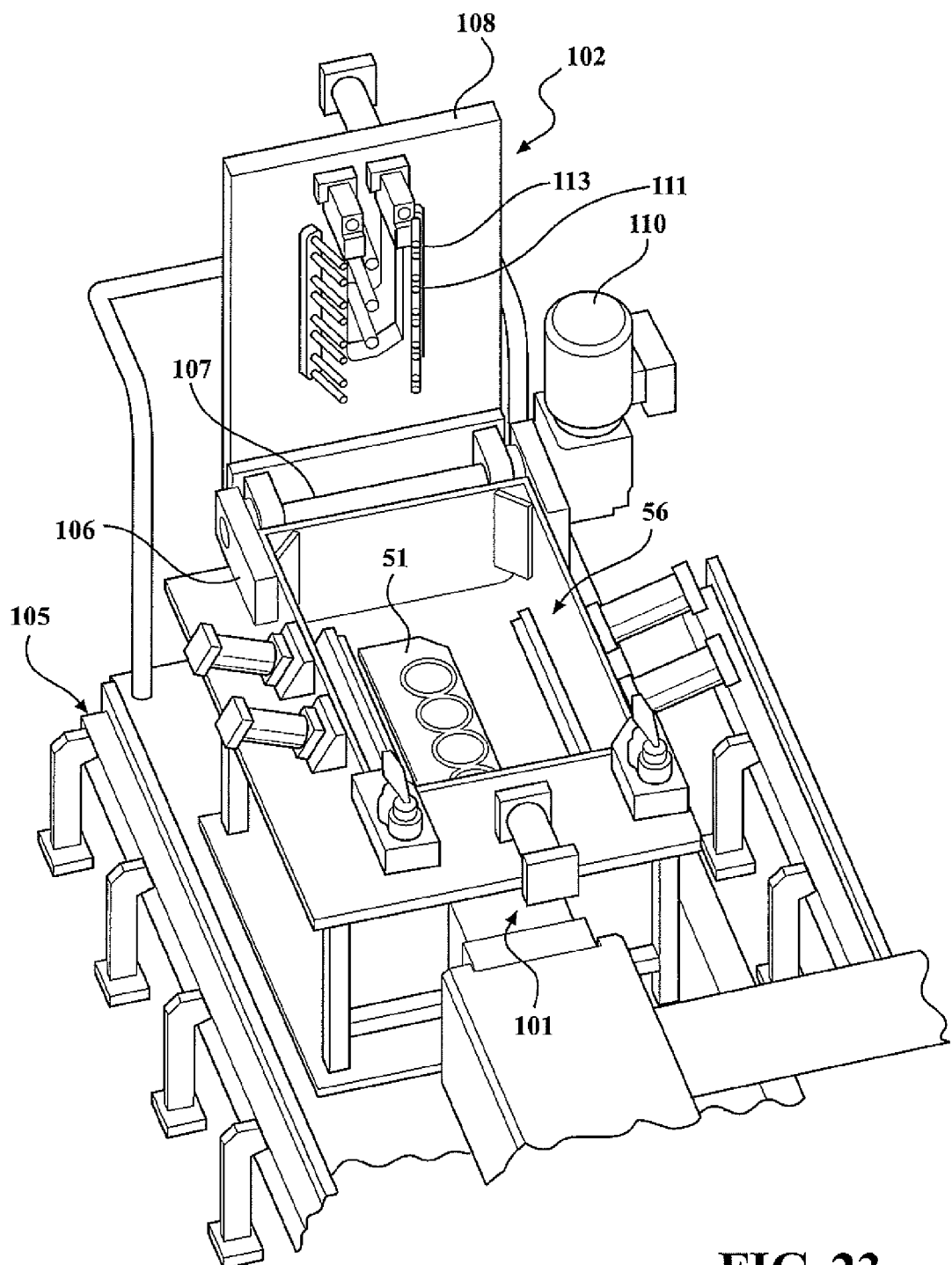
FIG. 23 is a perspective view showing the inside of the leak test box of the third embodiment of the flexible leak test apparatus and method of the present invention.
Figure 24:
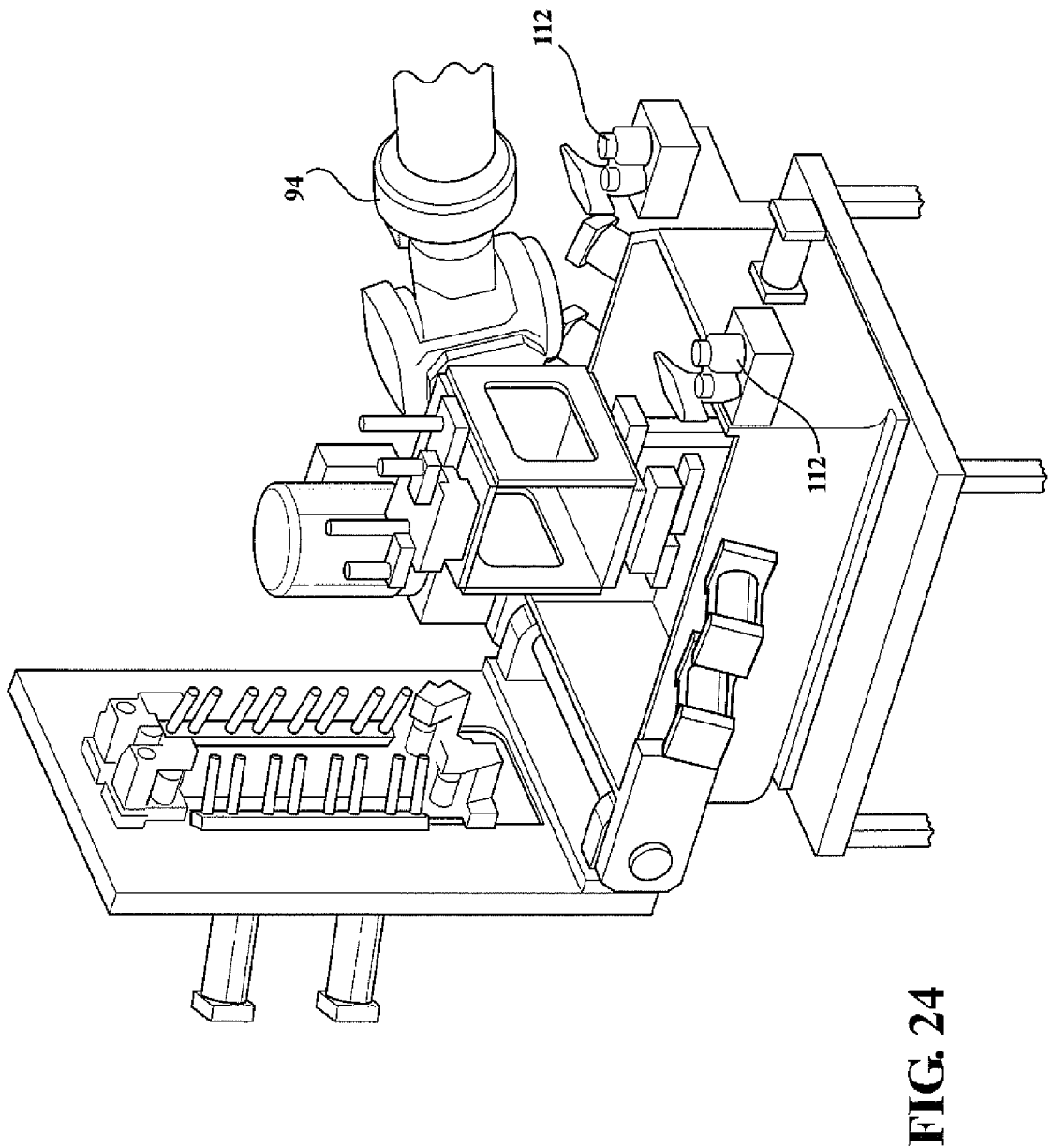
FIG. 24 is a perspective view of the top lid clamps of the leak test box of the flexible leak test apparatus and method of the present invention.
Figure 25:
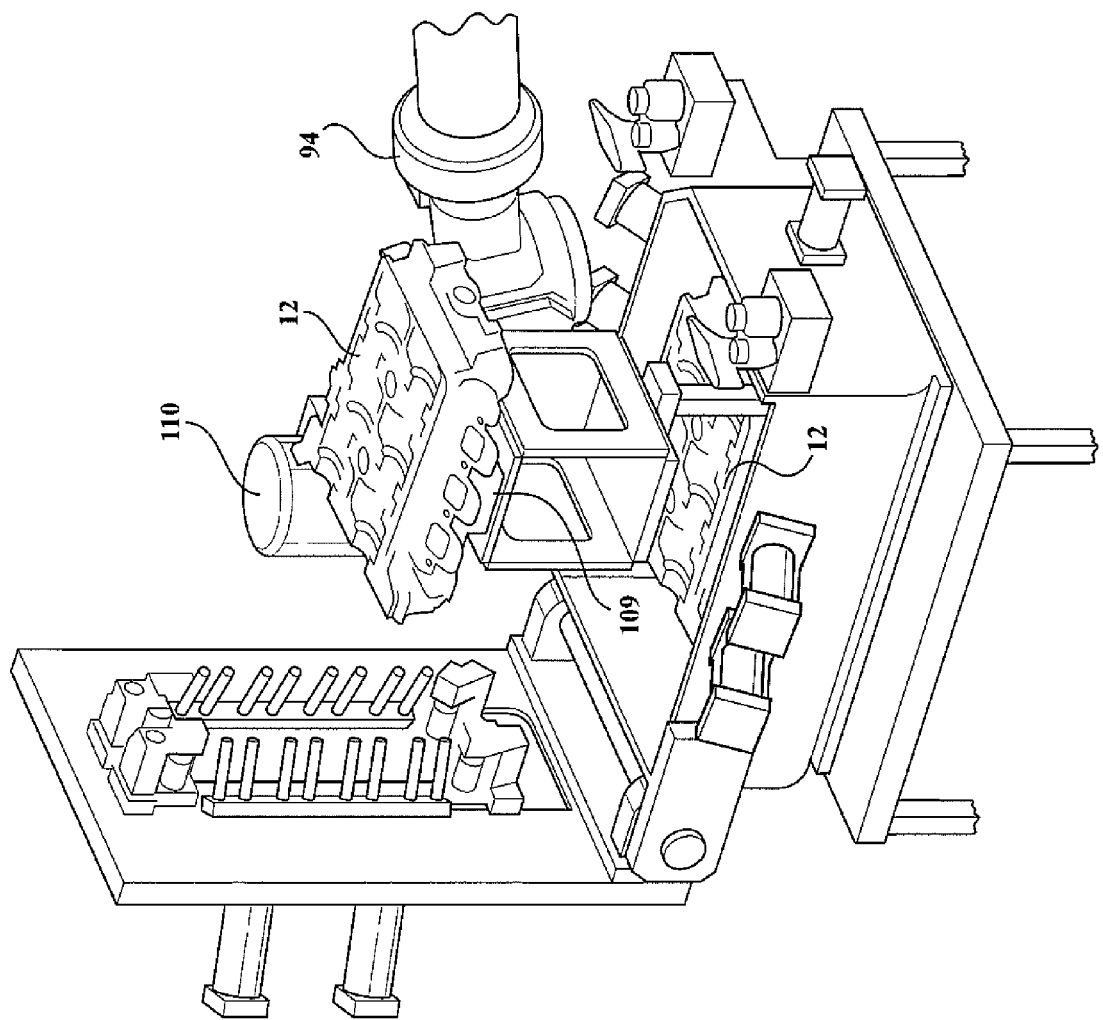
FIG. 25 is a perspective view showing the two part gripper of the third embodiment of the flexible leak test apparatus and method of the present invention.
Figure 26:
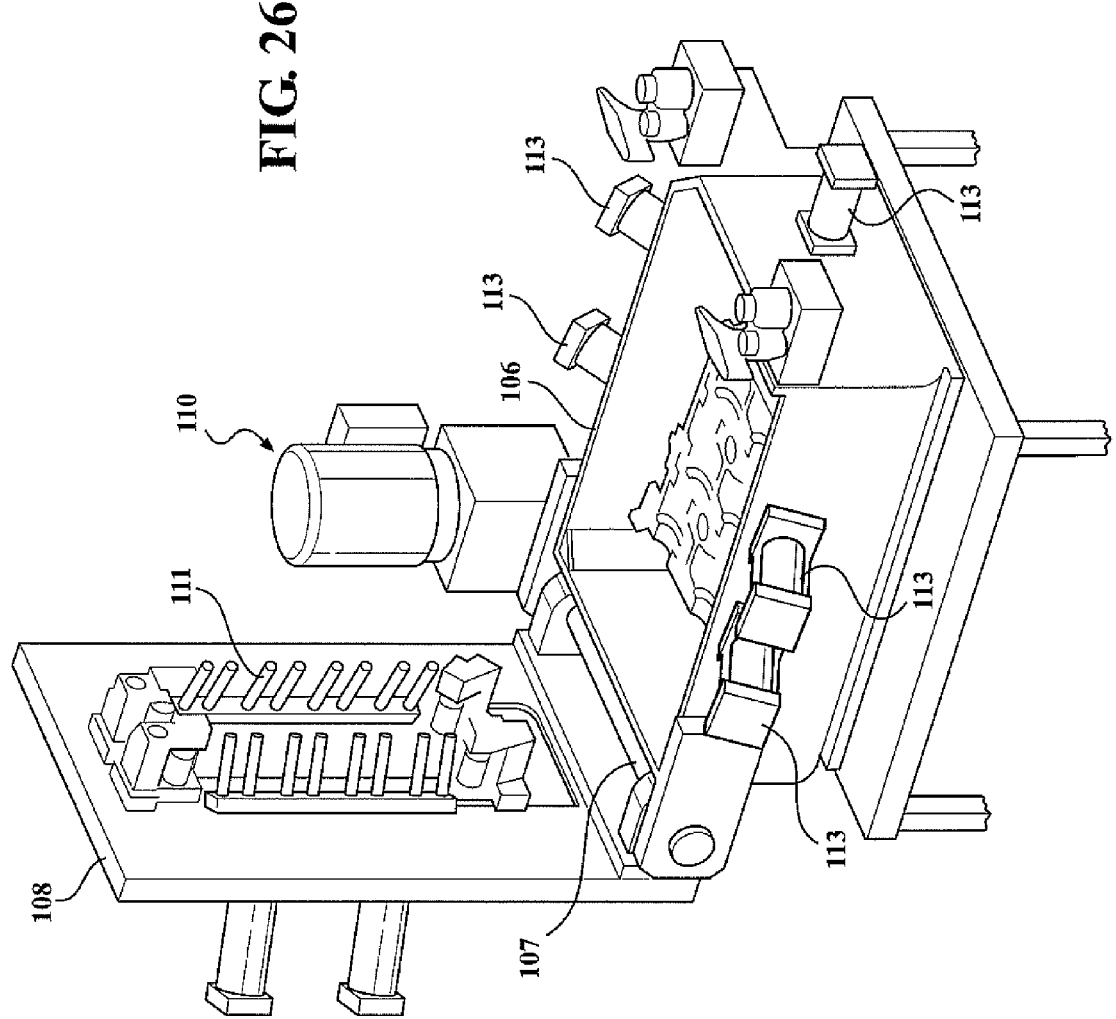
FIG. 26 is a perspective view showing a workpiece loaded in the leak test box of the third embodiment of the flexible leak test apparatus and method of the present invention.
Figure 27:
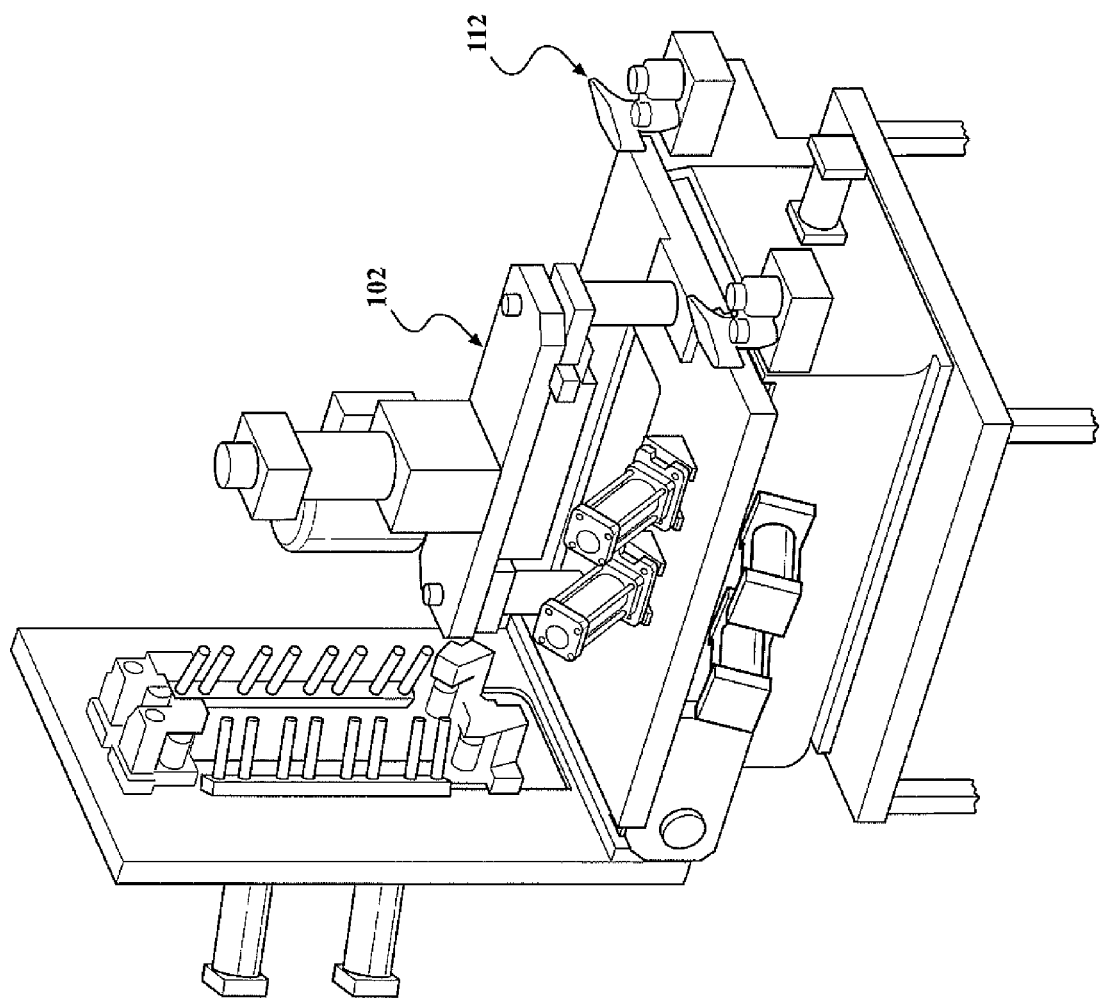
FIG. 27 is a perspective view of the leak test box shown in a closed position of the third embodiment of the flexible leak test apparatus and method of the present invention.

Each rolling cart 84 has a table 100 mounted thereon for supporting the leak test fixture 102. The rollable carts 84 may be manually rolled into a docking station or workstation 104 that provides a pair of substantially parallel rails 105 supported by legs that engage and prevent the rollable cart 84 from moving. The rollable carts 84 may be aligned directly adjacent one another in a straight row, or the rollable carts 84 may be aligned in an arcuate fashion, as shown in FIGS. 20-21. In this particular embodiment, the robotic arm 94 may be utilized to load and unload the workpieces 12 from a pair of conveyors 115, 117.

As seen in FIGS. 22-27, each leak test fixture 102 has a bottom portion 106 and a top portion 108, wherein the top portion 108 is hingedly connected to the bottom portion 106 through the use of a hinge 107 to allow the top portion 108 to swing open and closed with respect to the bottom portion 106 of the leak test fixture 102. The robotic arm 94 may be utilized to load the workpiece 12 into the bottom portion 106 of the leak test fixture 102, or the workpiece 12 may be loaded and unloaded from the leak test fixture 102 at a location away from the docking station 104. When the robotic arm 94 is utilized to load and unload the workpiece 12, the robotic arm 94 may utilize a two-part gripper 109 for loading and unloading two workpieces 12 at the same time. Once the workpiece 12 is loaded into the bottom portion 106 of the leak test fixture 102, an electric motor with a gear box 110 rotates the hinge 107 so as to close the top portion 108 of the leak test fixture 102 onto the bottom portion 106 of the leak test fixture 102. Two lid clamps 112 are utilized to lock the top portion 108 of the leak test fixture 102 to the bottom portion 106 of the leak test fixture 102. Clamps on the top portion 108 of the leak test fixture 102 may also be used to secure the workpiece 12. Pneumatic cylinders or linear actuators 113 mounted to the bottom portion 106 and the top portion 108 of the leak test fixture 102 are actuated so as to plug and seal the openings in the workpiece 12 as similarly described in the previous embodiments. Valve train seals 111 on the top portion 108 of the leak test fixture 102 seal the valve openings in the workpiece 12. A pressurized fluid source (not shown) supplies pressurized air to the internal cavity or cylinders of the workpiece 12 through ports in the leak test fixture 102 or through the pneumatic cylinders 113. Sensors (not shown) mounted within the leak test fixture 102 are utilized to monitor the air pressure within the internal cavity or cylinders of the workpiece 12 over a predetermined time period. Such signals are sent back to the computer 38 where they are interpreted to determine whether the workpiece 12 is leaking.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A flexible leak test apparatus for leak testing workpieces in a single workstation, wherein said workpieces have multiple geometric configurations with at least one internal cavity and at least one aperture leading therefrom, comprising:
    a plurality of leak test fixtures configured to receive said workpieces having multiple geometric configurations, and said leak test fixtures each forming a substantially rectangular enclosure having a bottom portion and a top portion to allow for access and engagement of all sides of said workpiece;
    means for automatically selecting and shuttling said plurality of leak test fixtures in and out of said single workstation;
    a robotic manipulator for automatically loading and unloading said workpieces into said bottom portion of said leak test fixtures;
    said top portion of said leak test fixtures automatically and removably engaging and partially enclosing said bottom portion of said leak test fixtures forming a top wall of said enclosure after said workpieces are loaded into said bottom portion of said leak test fixtures and contained within said leak test fixtures; and
    said bottom portion of said enclosure having a floor and side walls, wherein said side walls have seals that are adjustably connected thereto to accommodate multiple geometric configurations of said workpiece, wherein said leak test fixtures seal said at least one aperture in said workpieces so that said workpieces can be leak-tested in said single workstation by pressurizing said at least one internal cavity of said workpieces.

2. The apparatus as stated in claim 1, wherein said shuttling means further comprises:
    a pair of substantially parallel rails leading to and from said single workstation for slidably moving and supporting said bottom portion of said leak test fixtures; and
    a shuttle drive system provided between said rails, wherein said shuttle drive system automatically selects and moves said leak test fixtures in and out of said single workstation.

3. The apparatus stated in claim 1, wherein said shuttling means further comprises:
    a plurality of wheeled carts having said leak test fixtures mounted thereon, wherein said wheeled carts are manually directed to and from said workstation.

4. The apparatus as stated in claim 3, further comprising:
    a pair of guide rails in said workstation for guiding and stabilizing said wheeled carts in said workstation.

5. The apparatus as stated in claim 1, wherein said robotic manipulator further comprises:
    at least one robotic arm mounted to an overhead gantry.

6. The apparatus as stated in claim 1, wherein said robotic manipulator further comprises:
    a self-standing robotic arm.

7. The apparatus as stated in claim 1, further comprising:
    said manipulator engaging said top portion of said leak test fixtures and placing said top portion on and off said bottom portion of said leak test fixtures in an engaged position, wherein said leak test fixtures are in a position to leak test said workpieces, and a disengaged position, wherein said top portion is disengaged from said bottom portion of said leak test fixture for loading and unloading said workpieces into said bottom portion of said leak test fixture.

8. The apparatus as stated in claim 1, further comprising:
    said top portion of said leak test fixtures hingedly connected to said bottom portion of said leak test fixtures for movement between an engaged position, wherein said top portion engages said bottom portion of said leak test fixtures for leak-testing said workpiece, and a disengaged position, wherein said top portion is disengaged from said bottom portion of said leak test fixtures for loading and unloading said workpieces into said bottom portion of said leak test fixtures.

9. The apparatus as stated in claim 8, further comprising:
    a motor connected to said leak test fixture for hingedly moving said top portion of said leak test fixture between said engaged position and said disengaged position.

10. The apparatus as stated in claim 1, further comprising:
    said leak test fixtures having at least one linear actuator connected thereto, and said linear actuators having a sealing device connected thereto for automatically sealing said at least one aperture in said workpieces for leak-testing said workpieces.

11. The apparatus as stated in claim 1, further comprising:
said leak test fixtures in communication with a pressurized fluid source, wherein said pressurized fluid source sealedly connects to said internal cavity of said workpieces for leak-testing said workpieces.

12. The apparatus as stated in claim 1, further comprising:
said leak test fixtures having at least one sensor for sensing pressure in said internal cavity of said workpieces, and said at least one sensor in electronic communication with a computer, wherein said computer interprets signals from said at least one sensor to determine if said workpieces are leaking.

13. The apparatus as stated in claim 12, further comprising:
a controller interface having a first portion connected to said leak test fixture and in electronic communication with said at least one sensor, and a second portion located in said workstation and in electronic communication with said computer; and
said first portion and said second portion of said controller interface being releasably engageable with one another such that said first portion and said second portion of said controller interface engage one another in said workstation prior to leak-testing said workpieces such that said at least one sensor is in communication with said computer when leak-testing said workpieces.

14. The apparatus as stated in claim 1, further comprising:
at least one press fixture adaptable to receive said workpieces having multiple geometric configurations;
means for moving said at least one press fixture in and out of said workstation;
said manipulator loading and unloading said workpieces into said at least one press fixture and loading a component to be press-fit into said workpieces; and
a press tool for press-fitting said component into said workpieces.

15. The apparatus as stated in claim 14, further comprising:
said manipulator releasably engaging said press tool for press-fitting said component into said workpieces with said press tool.

16. The apparatus as stated in claim 14, further comprising:
said press tool being a self-standing press located in said workstation.

17. The apparatus as stated in claim 14, further comprising:
said at least one press fixture being rotatable to allow the press fitting of said components into various sides and angles of said workpieces.

18. The apparatus stated in claim 1, further comprising:
at least one conveyor for moving said workpieces to and from said single workstation, wherein said robotic manipulator engages said workpieces on said conveyor and moves said workpieces to and from said bottom portion of said leak test fixtures.

19. A flexible leak test apparatus for leak-testing workpieces in one of a pair of similar workstations, wherein said workpieces have multiple geometric configurations with at least one internal cavity and at least one aperture leading therefrom, comprising:
a plurality of leak test fixtures configured to receive said workpieces having different geometric configurations, and said leak test fixtures each forming a substantially rectangular enclosure having a bottom portion and a top portion to allow for access and engagement of all sides of said workpiece;
means for automatically selecting and shuttling said plurality of leak test fixtures in and out of one of said workstations;
a robotic arm for automatically loading and unloading said workpieces into said bottom portion of said leak test fixtures while in one of said workstations;
said top portion of said leak test fixtures automatically and removably engaging and partially enclosing said bottom portion of said leak test fixtures forming a top wall of said enclosure after said workpieces are loaded in said bottom portion of said leak test fixtures;
said bottom portion of said enclosure having a floor and side walls, wherein said side walls have seals that are adjustably connected thereto to accommodate multiple geometric configurations of said workpiece, wherein said plurality of leak test fixtures having at least one linear actuator connected thereto, and said at least one linear actuator having a sealing device connected thereto for automatically sealing said at least one aperture in said workpieces;
said leak test fixtures in communication with a pressurized fluid source wherein said pressurized fluid source sealedly connects to said internal cavity of said workpieces; and
a monitoring system having at least one sensor for measuring pressure in said internal cavity of said workpieces, and a computer in connection with said at least one sensor for interpreting measurements from said at least one sensor in determining whether said workpieces are leaking.

20. The apparatus as stated in claim 19, further comprising:
at least one press fixture adaptable to receive said workpieces having multiple geometric configurations;
means for moving said at least one press fixture in and out of said workstation;
said manipulator loading and unloading said workpieces onto said at least one press fixture and loading a component to be press-fit into said workpieces; and
a press tool for press-fitting said component into said workpieces.

* * * * *